US012745270B2

(12) United States Patent
Lee et al.

(10) Patent No.: US 12,745,270 B2
(45) Date of Patent: Sep. 22, 2026

(54) ELECTRONIC DEVICE FOR DEVICE-PROVISIONING IN WIRELESS NETWORK, AND OPERATING METHOD THEREFOR

(71) Applicant: Samsung Electronics Co., Ltd., Suwon-si (KR)

(72) Inventors: Dooho Lee, Suwon-si (KR); Buseop Jung, Suwon-si (KR); Beomjip Kim, Suwon-si (KR); Hakkwan Kim, Suwon-si (KR); Hyejung Bang, Suwon-si (KR); Sunkey Lee, Suwon-si (KR); Soonho Lee, Suwon-si (KR); Wonjun Jang, Suwon-si (KR); Namju Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 18/482,577

(22) Filed: Oct. 6, 2023

(65) Prior Publication Data

US 2024/0049266 A1 Feb. 8, 2024

Related U.S. Application Data

(63) Continuation of application No. PCT/KR2022/003840, filed on Mar. 18, 2022.

(30) Foreign Application Priority Data

Apr. 20, 2021 (KR) ........................ 10-2021-0051008

(51) Int. Cl.

*H04W 72/40* (2023.01)
*H04W 8/00* (2009.01)

(Continued)

(52) U.S. Cl.

CPC ........... *H04W 72/40* (2023.01); *H04W 8/005* (2013.01); *H04W 48/16* (2013.01); *H04W 84/12* (2013.01)

(58) Field of Classification Search

CPC ..... H04W 72/40; H04W 48/16; H04W 12/50; H04W 12/08; H04W 12/06;

(Continued)

(56) References Cited

U.S. PATENT DOCUMENTS 7,171,555 B1 1/2007 Salowey et al.
11,665,662 B2 5/2023 Ahn et al.

(Continued)

FOREIGN PATENT DOCUMENTS

JP 2014-017548 A 1/2014
JP 2020-043473 A 3/2020

(Continued)

OTHER PUBLICATIONS

Extended European Search Report dated Aug. 8, 2024, issued in European Application No. 22791895.0-1218.

(Continued)

*Primary Examiner* — Jungwon Chang
(74) *Attorney, Agent, or Firm* — Jefferson IP Law, LLP

(57) ABSTRACT

An electronic device is provided. The electronic device includes a communication module and a processor functionally connected to the communication module. The processor can be configured to receive, from an external electronic device, through a communication module, a configuration request frame including identification information for identifying a registrant access point (AP), in order to configure the external electronic device as the registrant AP, transmit, to the external electronic device, through the communication module, a configuration response frame including first channel information for indicating a channel used by the elec- (Continued)

tronic device in the scanning of the external electronic device, based on the configuration request frame, acquire connection information about the external electronic device by performing scanning through the communication module, based on the first channel information and the identification information, and connect to the external electronic device through the communication module based on the connection information about the external electronic device.

20 Claims, 31 Drawing Sheets

(51) Int. Cl.
*H04W 48/16* (2009.01)
*H04W 84/12* (2009.01)

(58) Field of Classification Search
CPC ........... H04W 12/0471; H04W 12/069; H04W 8/005; H04W 84/12
USPC ........................................................ 370/329
See application file for complete search history.

(56) References Cited

U.S. PATENT DOCUMENTS

2010/0115271 A1* 5/2010 Chen .................. H04W 12/033 713/160
2016/0007138 A1 1/2016 Palanisamy et al.
2016/0277370 A1* 9/2016 Lee ...................... H04W 12/35
2018/0091538 A1 3/2018 Narayanan et al.
2018/0109381 A1 4/2018 Cammarota et al.
2018/0109418 A1 4/2018 Cammarota et al.
2018/0270049 A1 9/2018 Cammarota et al.
2019/0026458 A1 1/2019 Choules et al.
2019/0123964 A1 4/2019 Lepp et al.
2019/0215878 A1 7/2019 Goto
2019/0306710 A1 10/2019 Cammarota et al.
2020/0169461 A1 5/2020 Stationwala et al.
2020/0221296 A1* 7/2020 Jiang .................. H04L 63/0869
2020/0252986 A1 8/2020 Komoriya
2021/0195420 A1 6/2021 Goto
2021/0195423 A1* 6/2021 Goto .................. H04W 12/041
2021/0219353 A1* 7/2021 Montemurro ....... H04W 12/069
2021/0385778 A1* 12/2021 Ahn ...................... H04W 60/00
2021/0400502 A1* 12/2021 Zhang .................. H04W 76/14
2022/0159461 A1 5/2022 Maass et al.

FOREIGN PATENT DOCUMENTS

KR 10-2017-0023178 A 3/2017
KR 10-2019-0015508 A 2/2019
KR 10-2019-0049774 A 5/2019
KR 10-2019-0068549 A 6/2019
KR 10-2020-0095375 A 8/2020
KR 10-2022-0057393 A 4/2022
WO 2019-194391 A1 10/2019
WO 2020/0080850 A1 4/2020
WO 2020-092971 A1 5/2020

OTHER PUBLICATIONS

Korean Office Action dated Jun. 11, 2025, issued in Korean Application No. 10-2021-0051008.
International Search Report dated Jun. 24, 2022, issued in International Patent Application No. PCT/KR2022/003840.
Wi-Fi Easy Connect Specification Version 2.0, Wi-Fi Alliance Proprietary—Subject to Change Without Notice, Dec. 14, 2022.

* cited by examiner

1800

| Attribute | Required (R) / Optional (O) / Conditional (C) | Notes |
|---|---|---|
| Responder Bootstrapping Key Hash | R | |
| Initiator Bootstrapping Key Hash | R | |
| Initiator Protocol Key | R | |
| Protocol Version | C | Present when the DPP Initiator supports protocol version 2 or higher. |
| Channel Attribute | O | |
| Wrapped Data | R | Ciphertext output of AES-SIV using intermediate key (k1) on Initiator nonce and Initiator Capabilities with AAD per section 6.3. |
| Initiator Nonce | R | This attribute is a component of the Wrapped Data |
| Initiator Capabilities (1805) | R | This attribute is a component of the Wrapped Data |

| Attribute | Required (R) / Optional (O) / Conditional (C) | Notes |
|---|---|---|
| DPP Status | R | Error code |
| Responder Bootstrapping Key Hash | C | Present when DPP Status is STATUS_OK |
| Initiator Bootstrapping Key Hash | C | In case DPP Status is STATUS_OK, only included for mutual authentication |
| Responder protocol Key | C | Present when DPP Status is STATUS_OK |
| Protocol Version | C | Present when the parameter is received in the Authentication Request Frame and the DPP Responder supports protocol version 2 or higher. |
| Primary Wrapped Data | R | Ciphertext output of AES-SIV using intermediate key k2 or k1 depending on whether DPP Status is STATUS_OK or indicates an error, respectively, with AAD per section 6.3 |
| Responder nonce | C | This is a component of the Primary Wrapped Data when DPP Status is STATUS_OK |
| Initiator nonce | R | This is a component of the Primary Wrapped Data |
| Responder capabilities (1905) | R | This is a component of the Primary Wrapped Data |
| Secondary Wrapped Data | C | Ciphertext output of AES-SIV using key ke on the Responder Authenticating Tag. This is a component of the Primary Wrapped Data when DPP Status is STATUS_OK, with AAD per section 6.3. |
| Responder Authenticating Tag | C | This is a component of the Secondary Wrapped Data |

| Parameter | Name | Type | Value | Scope | Description |
|---|---|---|---|---|---|
| DPP Configuration Request object | configRequest | OBJECT | | M | |
| Device Name | name | STRING | | M | |
| Wi-Fi Technology | wi-fi_tech | STRING | infra | M | The type of network with which the Enrollee wishes to be enrolled in. The wi-fi_tech value indicates which DPP Configuration Request object parameters are present beyond the mandatory name and wi-fi_tech and what values t those parameters use. This specification covers the wi-fi tech=infra case. Other specifications may define use of other wi-fi_tech values. Any such value needs to be assigned by Wi-Fi Alliance. |
| Network Role | netRole | STRING | sta, ap, configurator | M | The role that the Enrollee wishes to obtain. These values are used with the wi-fi_tech=infra case. |
| MUD URL | netRole | STRING | | O | A Universal Resource Locator for a Manufacturer Usage Description. This value is optionally included when the Enrollee has been manufactured with a MUD URL |
| Band Support (2005) | bandSupport | ARRAY | | O | A list of band parameters that are supported by the Enrollee |
| Band (2010) | Band | INTEGER | | O | An integer indicating the band as expressed as the Operating Class. The Operating Class values are given in the IEEE Document |
| CertificateRequest | pkcs10 | STRING | | O | A base64-encoded DER encoded CertificateRequest formatted per PKCS10. The usage of the CertificateRequest parameter is described in section DDP Configuration Response |
| Access Security Request (2015) | accessSecurity Request | STRING | PSK, Passphrase, Credentials | O | Security request for accessing AP |
| BSSID (2020) | Bssid | STRING | UTF-8 encoded string | O | The SSID for the ESS encoded as a UTF-8 encoded string. |

| Parameter | Name | Type | Value | Scope | Description |
|---|---|---|---|---|---|
| DPP Configuration object | configuration Object | OBJECT | | M | |
| Wi-Fi Technology object | wi-fi_tech | STRING | infra | M | The wi-fi_tech value indicates which DPP Configuration Attribute object parameters are present beyond the mandatory wi-fi_tech and what values those parameters use. This specification defines the wi-fi_tech=infra case. Other specifications may define use of other wi-fi_tech values. Any such value needs to be assigned by Wi-Fi Alliance. Those other values may define their own set of parameters to include in the DPP Configuration object. |
| Service | svc | STRING | | O | Optional parameter depending on the value of wi-fi_tech. |
| Discovery object | discovery | | | M | |
| SSID | ssid | STRING | UTF-8 encoded string | M | The SSID for the ESS encoded as a UTF-8 encoded string |
| SSID64 | ssid64 | STRING | BASE64URL encoded string | | The SSID for the ESS encoded as a BASE64URL string of octets. |
| SSID character set | ssid_charset | INTEGER | MIBenum | | The value of the character set that would be used to convert the ssid64 octet string into characters (if known). MIBenum values for character sets can be found in https://www.iana.org/assignments/character-sets/character-sets.xhtml. |
| Credential object | cred | OBJECT | | M | |

| Parameter | Name | Type | Value | Scope | Description |
|---|---|---|---|---|---|
| Authentication and key management type | akm | STRING | psk, dpp, sae, psk+sae, dot1x, dpp+sae, dpp+psk+sae or (only if Enrollee indicates Protocol Version value of 2 or higher), a list of one or more AKM suite selectors, delimited with a "+" character | M | The authentication type(s) for the network: When a list of AKM suite selectors is provided, each AKM suite selector (OUI and type) is encoded as a 4-octet hex-encoded value without internal delimiters, e.g. 506F9A02. |
| Pre-shared key (2105a) | psk_hex | STRING | | C | Pre-shared key encoded in hex. Conditionally present when akm parameter value contains "psk" or a PSK AKM suite selector. |
| WPA2 Passphrase and/or SAE password (2105b) | pass | STRING | | C | WPA2 or SAE passphrase. Conditionally present when akm parameter value contains psk or "sae", or a PSK and/or SAE AKM suite selector. |
| DPP Connector | signedConnector | STRING | | C | DPP Connector as a JWS, see section Connectors. Present when akm parameter value contains "dpp", or a DPP AKM suite selector or if the negotiated version is 2 or higher. |

| Parameter | Name | Type | Value | Scope | Description |
|---|---|---|---|---|---|
| C-sign-key | csign | JWK | | C | Configurator public key; "key_ops" and "use" objects in a "csign" object shall not be present. Present when akm parameter value contains "dpp", or a DPP AKM suite selector or if the negotiated version is 2 or higher. Note that JSON Web Keys use an uncompressed format |
| Enterprise Credentials (2105c) | entCreds | OBJECT | | C | Enterprise credentials for use when the akm parameter contains "dot1x". |
| Band Support (2110) | bandSupport | ARRAY | | O | A list of band parameters that are supported by the Enrollee |
| Band (2115) | Band | INTEGER | | O | An integer indicating the band as expressed as the Operating Class. The Operating Class values are given in the IEEE document. |

| Attribute | Required (R) / Optional (O) / Conditional (C) | Notes |
|---|---|---|
| Transaction ID | R | Unique one octet value identifying a pending request |
| Connector (2205) | R | JSON encoded Connector, see section DPP Configuration Object |
| Protocol Version | C | Present when the peer sending this frame supports protocol version 2 or higher. |

| Attribute | Required (R) / Optional (O) / Conditional (C) | Notes |
|---|---|---|
| Transaction ID | R | The number identifying the transaction, copied from the Peer Discovery Request |
| DPP Status | R | Error code |
| Connector (2305) | C | JSON encoded Connector, see section DPP Configuration Object |
| Protocol Version | C | Present when the peer sending this frame supports protocol version 2 or higher. |

| Parameter | Name | Type | Value | Scope | Description |
|---|---|---|---|---|---|
| DPP Connector Body object (2400) | dppCon | OBJECT | | M | This represents the JWS Payload of the Connector. |
| | groups[1] | ARRAY | | M | The groups array comprises an array of group objects. |
| | groupId | STRING | Freeform string or wildcard set to "*" | M | A string identifying the identity of the group in the group object. The owner of this Connector is allowed by the Configurator to connect to devices in this group. |
| | netRole (2405) | STRING | sta, ap, configurator | M | The role assigned to the owner of this Connector in this group. These values are used with the wi-fi_tech=infra case. Other specifications may define different netRole values for other wi-fi_tech values. |
| | netAccessKey | JWK | | M | JSON web key with encoding defined in RFC 7517; "key_ops" and "use" objects in a "netAccessKey" object shall not be present. Note that JSON Web Keys use an uncompressed format. |
| | expiry | STRING | | O | Timestamp for net access key expiry. |

| Parameter | Name | Type | Value | Scope | Description |
|---|---|---|---|---|---|
| DPP Configuration Request object | configRequest | OBJECT | | M | |
| Device Name | name | STRING | | M | |
| Wi-Fi Technology | wi-fi_tech | STRING | infra | M | The type of network with which the Enrollee wishes to be enrolled in. The wi-fi_tech value indicates which DPP Configuration Request object parameters are present beyond the mandatory name and wi-fi_tech and what values t those parameters use. This specification covers the wi-fi tech=infra case. Other specifications may define use of other wi-fi_tech values. Any such value needs to be assigned by Wi-Fi Alliance. |
| Network Role | netRole | STRING | sta, ap, configurator | M | The role that the Enrollee wishes to obtain. These values are used with the wi-fi_tech=infra case. |
| MUD URL | netRole | STRING | | O | A Universal Resource Locator for a Manufacturer Usage Description. This value is optionally included when the Enrollee has been manufactured with a MUD URL |
| Band Support (2705) | bandSupport | ARRAY | | O | A list of band parameters that are supported by the Enrollee |
| Band (2710) | Band | INTEGER | | O | An integer indicating the band as expressed as the Operating Class. The Operating Class values are given in the IEEE Document |
| CertificateRequest | pkcs10 | STRING | | O | A base64-encoded DER encoded CertificateRequest formatted per PKCS10. The usage of the CertificateRequest parameter is described in section DDP Configuration Response |
| Access Security Request (2715) | accessSecurity Request | STRING | BSSID, PSK, Passphrase, Credentials | O | Security request for accessing AP |

| Parameter | Name | Type | Value | Scope | Description |
|---|---|---|---|---|---|
| DPP Configuration object | configuration Object | OBJECT | | M | |
| Wi-Fi Technology object | wi-fi_tech | STRING | infra | M | The wi-fi_tech value indicates which DPP Configuration Attribute object parameters are present beyond the mandatory wi-fi_tech and what values those parameters use. This specification defines the wi-fi_tech=infra case. Other specifications may define use of other wi-fi_tech values. Any such value needs to be assigned by Wi-Fi Alliance. Those other values may define their own set of parameters to include in the DPP Configuration object. |
| Service | svc | STRING | | O | Optional parameter depending on the value of wi-fi_tech. |
| Discovery object | discovery | | | M | |
| SSID | ssid | STRING | UTF-8 encoded string | M | The SSID for the ESS encoded as a UTF-8 encoded string |
| SSID64 | ssid64 | STRING | BASE64URL encoded string | | The SSID for the ESS encoded as a BASE64URL string of octets. |
| BSSID (2805) | Bssid | STRING | UTF-8 encoded string | O | The SSID for the ESS encoded as a UTF-8 encoded string |
| SSID character set | ssid_charset | INTEGER | MIBenum | | The value of the character set that would be used to convert the ssid64 octet string into characters (if known). MIBenum values for character sets can be found in https://www.iana.org/assignments/character-sets/character-sets.xhtml. |
| Credential object | cred | OBJECT | | M | |

| Parameter | Name | Type | Value | Scope | Description |
|---|---|---|---|---|---|
| Authentication and key management type | akm | STRING | psk, dpp, sae, psk+sae, dot1x, dpp+sae, dpp+psk+sae or (only if Enrollee indicates Protocol Version value of 2 or higher), a list of one or more AKM suite selectors, delimited with a "+" character | M | The authentication type(s) for the network: When a list of AKM suite selectors is provided, each AKM suite selector (OUI and type) is encoded as a 4-octet hex-encoded value without internal delimiters, e.g. 506F9A02. |
| Pre-shared key (2810a) | psk_hex | STRING | | C | Pre-shared key encoded in hex. Conditionally present when akm parameter value contains "psk" or a PSK AKM suite selector. |
| WPA2 Passphrase and/or SAE password (2810b) | pass | STRING | | C | WPA2 or SAE passphrase. Conditionally present when akm parameter value contains psk or "sae", or a PSK and/or SAE AKM suite selector. |
| DPP Connector | signedConnector | STRING | | C | DPP Connector as a JWS, see section Connectors. Present when akm parameter value contains "dpp", or a DPP AKM suite selector or if the negotiated version is 2 or higher. |

| Parameter | Name | Type | Value | Scope | Description |
|---|---|---|---|---|---|
| C-sign-key | csign | JWK | | C | Configurator public key; "key_ops" and "use" objects in a "csign" object shall not be present. Present when akm parameter value contains "dpp", or a DPP AKM suite selector or if the negotiated version is 2 or higher. Note that JSON Web Keys use an uncompressed format |
| Enterprise Credentials (2810c) | entCreds | OBJECT | | C | Enterprise credentials for use when the akm parameter contains "dot1x". |
| Band Support (2815) | bandSupport | ARRAY | | O | A list of band parameters that are supported by the Enrollee |
| Band (2820) | Band | INTEGER | | O | An integer indicating the band as expressed as the Operating Class. The Operating Class values are given in the IEEE document. |

FIG. 28C

ELECTRONIC DEVICE FOR DEVICE-PROVISIONING IN WIRELESS NETWORK, AND OPERATING METHOD THEREFOR

CROSS-REFERENCE TO RELATED APPLICATION(S)

This application is a continuation application, claiming priority under § 365(c), of an International application No. PCT/KR2022/003840, filed on Mar. 18, 2022, which is based on and claims the benefit of a Korean patent application number 10-2021-0051008, filed on Apr. 20, 2021, in the Korean Intellectual Property Office, the disclosure of which is incorporated by reference herein in its entirety.

BACKGROUND

1. Field

The disclosure relates to an electronic device for device-provisioning in a wireless network, and an operating method therefor.

2. Description of Related Art

A wireless communication system is being developed widely in order to provide various types of communication services, such as voice or data. Generally, the wireless communication system is a multiple-access system which is capable of supporting communication with multiple users by sharing available system resources (e.g., a frequency, a bandwidth, or output power). Multiple-access systems may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Recently, various wireless communication technologies are being developed along with the development of an information communication technology. Among such technologies, a wireless local area network (WLAN) technology is technology which may allow access to Internet in a wireless manner at a home, an office, or a specific service provision area using an electronic device, such as a smartphone, a personal digital assistant (PDA), or a laptop computer, based on a wireless frequency technology.

In order to secure flexibility of communication between devices in a WLAN system, various protocols have been proposed for direct communication between devices, without going through a management entity, such as a base station (BS) or an access point (AP). Wi-Fi alliance (WFA) which is based on a Wi-Fi standard provides a device provisioning protocol (DPP) capable of simply and efficiently connecting a Wi-Fi device, which does not have a user interface (UI) or has a limited UI, to a Wi-Fi network.

The above information is presented as background information only to assist with an understanding of the disclosure. No determination has been made, and no assertion is made, as to whether any of the above might be applicable as prior art with regard to the disclosure.

SUMMARY

In a DPP technology which has been standardized by WFA based on a Wi-Fi standard, roles of a configurator and an enrollee are provided for provisioning. To enable an enrollee terminal (station (STA)) to connect to an enrollee AP, a DPP configurator may configure the enrollee STA and the enrollee STA. To this end, the DPP configurator may perform bootstrapping, authentication, and configuration operations with each of the enrollee STA and the enrollee AP.

After the configuration operation, the enrollee STA (or a group client (GC)) may perform scanning to search for a channel in which the enrollee AP (or a group owner (GO) or a Hotspot) operates.

The DPP configurator may configure the enrollee STA, or may operate (act) as an AP for the enrollee STA, or may operate as an STA for the enrollee AP after configuring the enrollee STA. The DPP configurator needs to perform the same operations above to connect to the enrollee AP while operating as the enrollee STA. Similarly, the DPP configurator also performs the same operations above when connecting to the enrollee STA while operating as the enrollee AP.

Aspects of the disclosure are to address at least the above-mentioned problems and/or disadvantages and to provide at least the advantages described below. Accordingly, an aspect of the disclosure is to provide an electronic device for device provision in a wireless network, and an operating method therefor.

Another aspect of the disclosure is to provide an electronic device for configuring an enrollee AP, operating as an enrollee STA, and connecting to the enrollee AP, through a DPP process, and an operating method therefor.

Another aspect of the disclosure is to provide an electronic device for configure an enrollee STA, operating as an enrollee AP, and connecting to the enrollee STA, through a DPP process, and an operating method therefor.

Additional aspects will be set forth in part in the description which follows and, in part, will be apparent from the description, or may be learned by practice of the presented embodiments.

In accordance with an aspect of the disclosure, an electronic device is provided. The electronic device includes a communication module and at least one processor functionally connected to the communication module, wherein the at least one processor is configured to receive, from an external electronic device through the communication module, a configuration request frame including identification information identifying an enrollee access point (AP) to configure the external electronic device as the enrollee AP, transmit, to the external electronic device through the communication module, a configuration response frame including first channel information indicating a channel used in scanning the external electronic device by the electronic device, based on the configuration request frame, acquire connection information of the external electronic device by perform scanning through the communication module, based on the first channel information and the identification information, and connect to the external electronic device through the communication module, based on the connection information of the external electronic device.

In accordance with another aspect of the disclosure, a method performed by an electronic device is provided. The method includes receiving, from an external electronic device, a configuration request frame including identification information identifying an AP to configure the external electronic device as the enrollee AP, transmitting, to the external electronic device, a configuration response frame including first channel information indicating a channel used in scanning the external electronic device by the electronic device, based on the configuration request frame, acquiring connection information of the external electronic device by performing scanning based on the first channel information, and connecting to the external electronic device, based on the connection information of the external electronic device.

In accordance with another aspect of the disclosure, an electronic device is provided. The electronic device includes a communication module and at least one processor functionally connected to the communication module, wherein the at least one processor is configured to receive, from an external electronic device through the communication module, a configuration request frame configured to configure the external electronic device as an enrollee terminal (STA), transmit, to the external electronic device through the communication module, a configuration response frame including first channel information indicating a channel used while the electronic device operates as an AP and identification information identifying the enrollee AP, based on the configuration request frame, broadcast, through the communication module, a beacon signal scannable by the external electronic device, based on the first channel information and the identification information, and connect to the external electronic device through the communication module while operating as the enrollee AP.

In accordance with another aspect of the disclosure, a method performed by an electronic device is provided. The method includes receiving, from an external electronic device, a configuration request frame configured to configure the external electronic device as an STA, transmitting, to the external electronic device, a configuration response frame including first channel information indicating a channel used while the electronic device operates as an AP and identification information identifying the enrollee AP, based on the configuration request frame, broadcasting a beacon signal scannable by the external electronic device, based on the first channel information and the identification information, and connecting to the external electronic device while operating as the enrollee AP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 18 illustrates a format of a DPP authentication request frame according to an embodiment of the disclosure;

FIG. 19 illustrates a format of a DPP authentication response frame according to an embodiment of the disclosure;

FIG. 20 illustrates a format of a DPP configuration request frame according to an embodiment of the disclosure;

FIGS. 21A, 21B, and 21C illustrate a format of a DPP configuration response frame according to various embodiments of the disclosure;

FIG. 22 illustrates a format of a peer discovery request frame according to an embodiment of the disclosure;

FIG. 23 illustrates a format of a peer discovery response frame according to an embodiment of the disclosure;

FIG. 24 illustrates a format of a DPP connector body object included in connector information according to an embodiment of the disclosure;

FIG. 27 illustrates a format of a DPP configuration request frame according to an embodiment of the disclosure;

FIGS. 28A, 28B, and 28C illustrate a format of a DPP configuration response frame according to various embodiments of the disclosure.

Throughout the drawings, it should be noted that like reference numbers are used to depict the same or similar elements, features, and structures.

DETAILED DESCRIPTION

Figure 1:
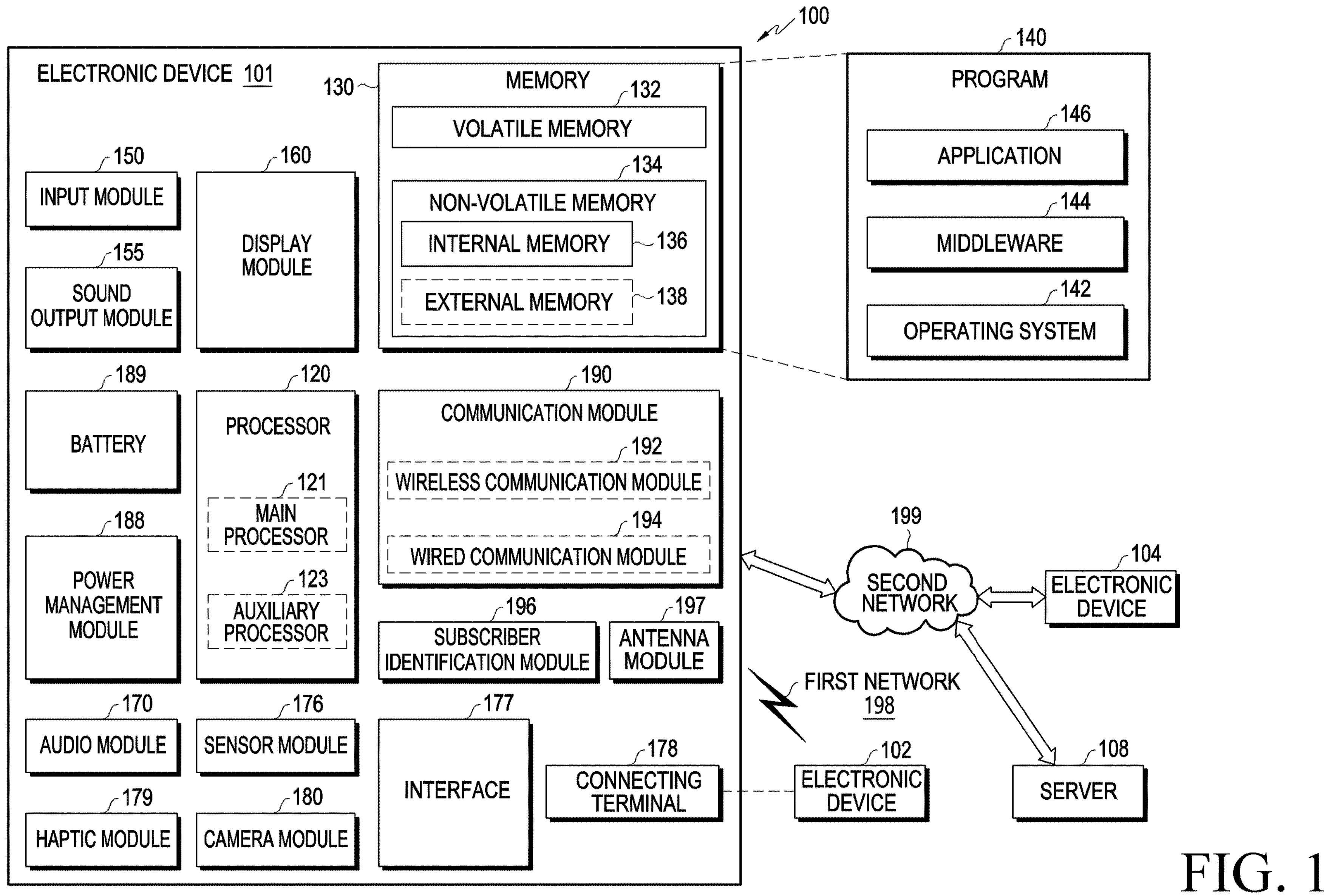
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Moreover, when the technical terms used herein are wrong technical terms that cannot correctly represent the idea of the disclosure, it should be appreciated that they are replaced by technical terms correctly understood by those skilled in the art. Alternatively, the general terms used in various embodiments of the disclosure should be interpreted as defined in dictionaries or interpreted in the context of the relevant part, and should not be interpreted to have excessively restricted meanings.

As used herein, such an expression as "comprises" or "include" should not be interpreted to necessarily include all elements or all steps described in the specification, and should be interpreted to be allowed to exclude some of them or further include additional elements or steps.

Alternatively, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described below with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Alternatively, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

In the following, a terminal will be described in various embodiments of the disclosure, but the terminal may also be called an electronic device, a mobile station, a mobile equipment (ME), a user equipment (UE), a user terminal (UT), a subscriber station (SS), a wireless device, a handheld device, or an access terminal (AT). Alternatively, in various embodiments of the disclosure, the terminal may be a device having a communication function, such as a mobile phone, a personal digital assistant (PDA), a smartphone, a wireless modem, or a notebook.

Alternatively, in describing various embodiments of the disclosure, reference will be made to standards provided by the institute of electrical and electronics engineers (IEEE) and Wi-Fi alliance (WFA) which are radio access standardization groups, but based on determinations by those skilled in the art, the main idea of the disclosure may be applied to other communication systems having similar technical backgrounds through some modifications without significantly departing from the scope of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

According to various embodiments of the disclosure, in the WFA, a device provision protocol (DPP) based on a Wi-Fi technology is provided. The DPP is a protocol enabling a Wi-Fi device including no user interface (UI) or including a UI with restriction to be simply and efficiently connected to a Wi-Fi network.

Figure 2:
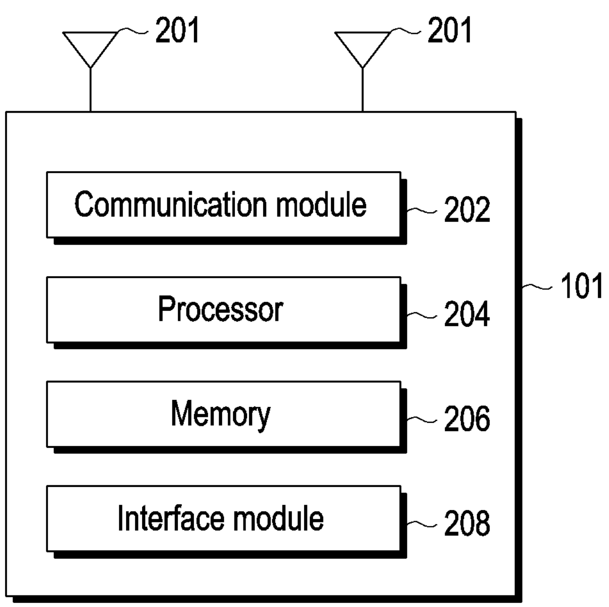
FIG. 2 is a block diagram illustrating an electronic device according to an embodiment of the disclosure.

FIG. 2 is a block diagram illustrating an electronic device 101 according to an embodiment of the disclosure.

Referring to FIG. 2, an electronic device (for example, the electronic device 101 of FIG. 1) may be a device for implementing a DPP. Hereafter, for convenience of description, the device for implementing the DPP may be referred to as a DPP device. The electronic device 101 may include a communication module 202 (for example, the wireless communication module 192 of FIG. 1) for transmitting or receiving signals to or from an external electronic device (for example, the external electronic device 102 or 104 of FIG. 1), for example, a peer device, by using one or more antennas 201.

The electronic device 101 may include a processor 204 (for example, the processor 120 of FIG. 1) which can be implemented as one or more single-core processors or one or more multi-core processors, and a memory 206 (for example, the memory 130 of FIG. 1) for storing instructions for the operation of the electronic device 101.

The electronic device 101 may include an interface module 208 (for example, the interface 177 of FIG. 1) for providing a wired and/or wireless interface for communicating with a component external to a network. At least some of the one or more antennas 201, the communication module 202, or the interface module 208 may be implemented as, for example, at least some of the communication module 190 and the antenna module 197 of FIG. 1.

The communication module 302 and the processor 304 may process various wireless control functions so as to communicate with one or more wireless networks according to one or more wireless technologies. An example of the wireless technologies may include worldwide interoperability for microwave access (WiMax), Wi-Fi, global system for mobile communications (GSM), enhanced data rates for GSM (EDGE), GSM EDGE radio access network (GERAN), universal mobile telecommunication system (UMTS), universal terrestrial radio access network (UTRAN), $3^{rd}$ generation (3G), 4G, 5G, or beyond-5G, which has already been developed or can be developed in the future. In an embodiment of the disclosure, the communication module 302 may include a WLAN communication module capable of communicating signals for a DPP process with at least one external electronic device.

An electronic device according to an embodiment may include a communication module and at least one processor functionally connected to the communication module. The at least one processor may be configured to receive, from an external electronic device through the communication module, a configuration request frame including identification information identifying an enrollee access point (AP) to configure the external electronic device as the enrollee AP, transmit, to the external electronic device through the communication module, a configuration response frame including first channel information indicating a channel used in scanning the external electronic device by the electronic device, based on the configuration request frame, acquire connection information of the external electronic device by performing scanning through the communication module, based on the first channel information and the identification information, and connect to the external electronic device through the communication module, based on the connection information of the external electronic device.

In an embodiment of the disclosure, the at least one processor may be configured to transmit, to the external electronic device, a peer discovery request frame including network role information indicating that the electronic device is an enrollee terminal (STA), based on the connection information, receive a peer discovery response frame corresponding to the peer discovery request frame from the external electronic device, and connect to the external electronic device, based on the peer discovery response frame.

In an embodiment of the disclosure, the configuration request frame may include second channel information indicating a channel in which the external electronic device operates as the enrollee AP, and the second channel information may be used to generate the first channel information.

In an embodiment of the disclosure, the first channel information may include at least one of a support band field indicating at least one frequency band supported by the electronic device, or a band field indicating a frequency band which can be used while the electronic device operates as an enrollee STA, and the scanning may include searching for the enrollee AP having the identification information on a channel indicated by the first channel information.

In an embodiment of the disclosure, the configuration request frame may include request information requesting secure information used while the electronic device operates as an enrollee STA, and the configuration response frame may include the secure information in response to the request information.

In an embodiment of the disclosure, the configuration response frame may include, secure information used while the electronic device operates as an enrollee STA, and the secure information may include at least one of a preshared key (PSK), a passphrase, or a credential.

An electronic device according to an embodiment may include a communication module and at least one processor functionally connected to the communication module. The at least one processor may be configured to receive, from an external electronic device through the communication module, a configuration request frame configured to configure the external electronic device as an enrollee terminal (STA), transmit, to the external electronic device through the communication module, a configuration response frame including first channel information indicating a channel used while the electronic device operates as an enrollee access point (AP) and identification information identifying the enrollee AP, based on the configuration request frame, broadcast, through the communication module, a beacon signal scannable by the external electronic device, based on the first channel information and the identification information, and connect to the external electronic device through the communication module while operating as the enrollee AP.

In an embodiment of the disclosure, the at least one processor may be configured to receive, from the external electronic device, a peer discovery request frame, in response to the peer discovery request frame, transmit, to the external electronic device, a peer discovery response frame including network role information indicating that the electronic device is the enrollee AP, and connect to the external electronic device, based on the peer discovery response frame.

In an embodiment of the disclosure, the configuration request frame may include second channel information indicating a channel in which the external electronic device operates as the enrollee AP, and the second channel information may be used to generate the first channel information.

In an embodiment of the disclosure, the first channel information may include at least one of a support band field indicating at least one frequency band supported by the electronic device, or a band field indicating a frequency band which can be used while the electronic device operates as an enrollee STA, and the beacon signal may include the identification information and is transmitted on a channel indicated by the first channel information.

In an embodiment of the disclosure, the configuration request frame may include request information requesting secure information used while the electronic device operates as the enrollee AP, and the configuration response frame may include the secure information in response to the request information.

Hereinafter, a device provision protocol (DPP), prosed based on the Wi-Fi specification in the WFA, is described.

Providing a process enabling a Wi-Fi device to be simply and safely connected to a network is necessary for continuous success and expansion of the Wi-Fi technology. Specifically, in the market, such as smart homes and Internet of things (IoT) employing many Wi-Fi devices which include no user interface, or include a user interface with restrictions, providing the process enabling the Wi-Fi device to be simply and safely connected to the network is more necessary.

To configure a network connection of the Wi-Fi device, network information and secure information may be provided to the Wi-Fi device. Accordingly, an operation of adding the Wi-Fi device including no user interface, or including a user interface with restrictions is not only cumbersome but also performed in difference schemes according to manufacturers of the Wi-Fi device.

The DPP technology may provide a Wi-Fi device configuration scheme enabling the Wi-Fi device to be simply and efficiently connected to the Wi-Fi network. Specifically, the DPP technology may support the Wi-Fi device including no user interface, or including a restricted user interface to be simply and efficiently connected to the Wi-Fi network.

In the DPP, the configuration of the Wi-Fi device can be simplified based on a standardized mechanism, and for example, the Wi-Fi device can be directly connected to the Wi-Fi network in a relatively easy scheme, such as scanning a product quick response (QR) code by using a smartphone. In an embodiment of the disclosure, the DPP technology may provide an enhanced user experience, reinforced security, and/or IoT device provision support while simultaneously simplifying a network setup and client device provisioning, for example.

In the DPP technology, in a network, such as home or office, a network manager may set up an access point (AP) by using a reliable device, for example, a reliable device, such as a smartphone, and may also manage network accesses of a client device, for example, other Wi-Fi devices. For example, the DPP may maintain a secure network connection by using a strong encryption principle while supporting a smooth user experience.

Figure 3:
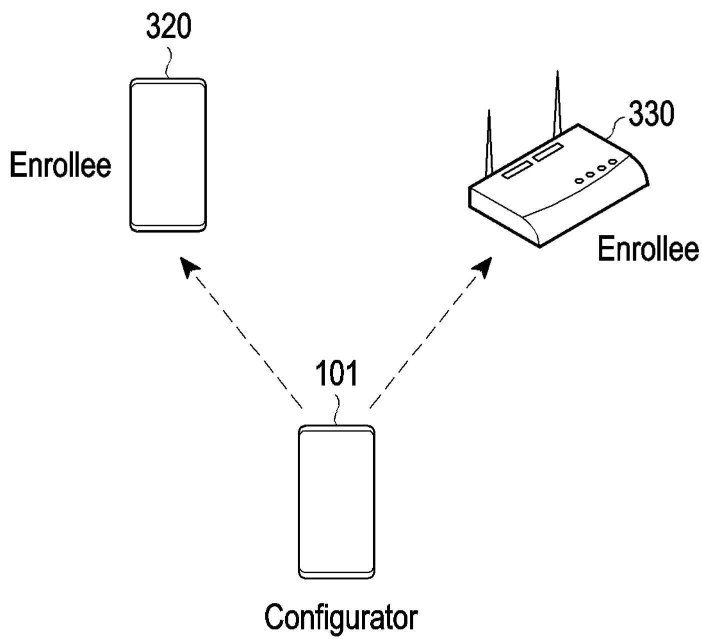
FIG. 3 schematically illustrates an architecture of a device provisioning protocol (DPP) network according to an embodiment of the disclosure.

FIG. 3 schematically illustrates an architecture of a DPP network according to an embodiment of the disclosure. As illustrated, each electronic device in the DPP network may perform a Wi-Fi provisioning role.

Referring to FIG. 3, the DPP network may include multiple electronic devices implementing the DPP, for example, the electronic device 101 and one or more external electronic devices (for example, a first external electronic device 320 and a second external electronic device 330).

The DPP architecture may define device roles during a DPP bootstrapping operation, a DPP authentication operation, a DPP provision (or configuration) operation, and a DPP connectivity (or introduction) operation, and the device roles may include two types, for example, a configurator and an enrollee, or an initiator and a responder. In the illustrated example, the electronic device 101 may operate as a configurator, and each of the first external electronic device 320 and the second external electronic device 330 may operate as an enrollee.

In the DPP network, the configurator may be a logical entity having capabilities of registering and provisioning devices for device-to-device (D2D) communication or infrastructure communication.

In the DPP network, the initiator indicates a DPP device initiating a DPP authentication protocol, and one of the configurator and the enrollee may be the initiator. In an embodiment of the disclosure, the responder indicates a DPP device for responding to initiation of the DPP authentication protocol by the initiator, and one of the configurator and the enrollee may be the responder.

The configurator may support a setup of the enrollee, and the configurator and the enrollee may be involved in the DPP bootstrapping operation, the DPP authentication operation, and the DPP configuration operation. The configurator or the enrollee may operate as the initiator in the DPP bootstrapping operation and the DPP authentication operation. Unlike the DPP bootstrapping operation and the DPP authentication operation, the DPP configuration operation and the DPP instruction operation may be initiated by the enrollee only.

The configurator and the enrollee may own bootstrapping keys from the same elliptic curve before a start of the DPP authentication operation. In an embodiment of the disclosure, the elliptic curve may be an algorithm used to generate encryption keys, and a scheme of generating the encryption keys may not be limited to the elliptic curve. In an embodiment of the disclosure, as necessary (and according to a bootstrapping method), the bootstrapping keys may be generated upon a request. The DPP authentication operation may require for the initiator to acquire a bootstrapping key of the responder as a part of the previous bootstrapping mechanism. Optionally, in the DPP authentication operation, the configurator and the enrollee may acquire the bootstrapping keys of the configurator and the enrollee each other to provide mutual authentication.

After the authentication is completed, the configurator may perform provisioning of the enrollee to perform D2D communication or infrastructure communication. As a part of such provisioning, the configurator may enable the enrollee to configure secure associations with other peers, for example, other external electronic devices in the DPP network.

The configurator and the enrollee may be described below.

First, the configurator is described.

In an embodiment of the disclosure, in the DPP network, a specific DPP device, for example, a main DPP device, may be designated as a configurator. The configurator is a central configuration point, and may perform provisioning of all DPP devices included in the DPP network including an AP. One of various DPP devices included in the DPP network may be a configurator.

Second, the enrollee is described.

In an embodiment of the disclosure, the enrollee is a DPP device for connecting a network manager of the DPP network to the DPP network. The DPP device added to the DPP network, for example, an AP, smart appliances, a computer, a printer, or a TV may be an enrollee. All DPP devices capable of implementing a Wi-Fi function, except for the configurator, may be an enrollee. A DPP device may be an enrollee through an enrollment process.

Figure 4:
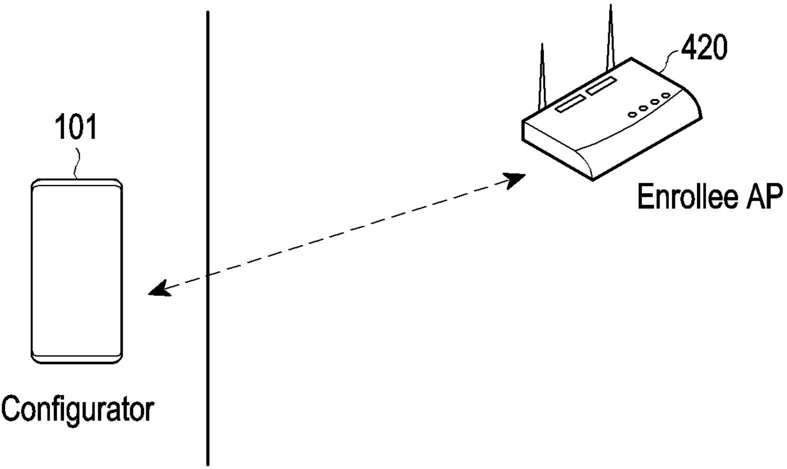
FIG. 4 schematically illustrates a network construction operation in a DPP network according to an embodiment of the disclosure.

FIG. 4 schematically illustrates a network construction operation in a DPP network according to an embodiment of the disclosure.

Referring to FIG. 4, a DPP network may include multiple electronic devices, for example, an electronic device (for example, the electronic device 101) and an external electronic device (for example, an electronic device 420). Referring to FIG. 4, each of the electronic device 101 and the external electronic device 420 may be a DPP device, the electronic device 101 may operate as a configurator, and the external electronic device 420 may operate as an enrollee AP.

In an embodiment of the disclosure, the electronic device 101 may perform provisioning of the external electronic device 420 corresponding to an enrollee, for example, an initial AP, based on the DPP. The electronic device 101 may perform provisioning of an enrollee client (not separately shown in FIG. 4) corresponding to another enrollee, and accordingly, may enable enrollees to search for, select, and connect to the DPP network.

In an initial enrollment procedure, a network manager of the DPP network may configure the electronic device 101 corresponding to a mobile device (for example, a smartphone) as a configurator, and then may configure the external electronic device 420 as an AP (i.e., referred to as an enrollee AP) considered as an enrollee, through the electronic device 101. Such an AP configuration operation may be performed before the network connection, and the DPP network may be constructed through such an AP configuration operation.

Figure 5:
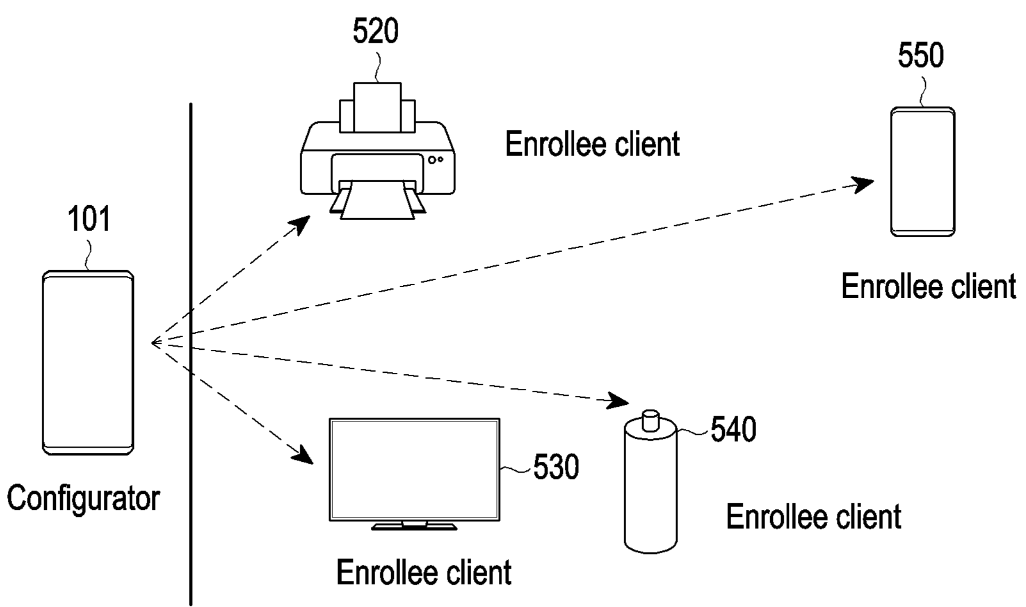
FIG. 5 schematically illustrates an enrollment operation in a DPP network according to an embodiment of the disclosure.

FIG. 5 schematically illustrates an enrollment operation in a DPP network according to an embodiment of the disclosure.

Referring to FIG. 5, after a DPP network is constructed, a manager of the DPP network may initiate an enrollment procedure of enrolling DPP devices. In an embodiment of the disclosure, the DPP network may include multiple electronic devices, for example, an electronic device (for example, the electronic device 101) and one or more external electronic devices (for example, a first external electronic device 520, a second external electronic device 530, a third external electronic device 540, and a fourth external electronic device 550). The electronic device 101 may operate as a configurator, and each of the first external electronic device 520, the second external electronic device 530, the third external electronic device 540, and the fourth external electronic device 550 may operate as an enrollee client.

At least one of the first external electronic device 520, the second external electronic device 530, the third external electronic device 540, and the fourth external electronic device 550 may acquire a configuration for a connection for the DPP network, based on information provisioned in the electronic device 101. Then, the electronic device 101 may generate configuration information including a security credential with an external electronic device, and accordingly, the external electronic device may configure a connection to the DPP network.

In an embodiment of the disclosure, the security credential may be information required to join a peer to peer (P2P) group. In an embodiment of the disclosure, the security credential information may include connector information related to the external electronic device, a C-sign key used to verify the external electronic device signed by the electronic device 101, a legacy preshared key (PSK), or a passphrase according to a value of an authentication and key management (AKM) parameter.

Figure 6:
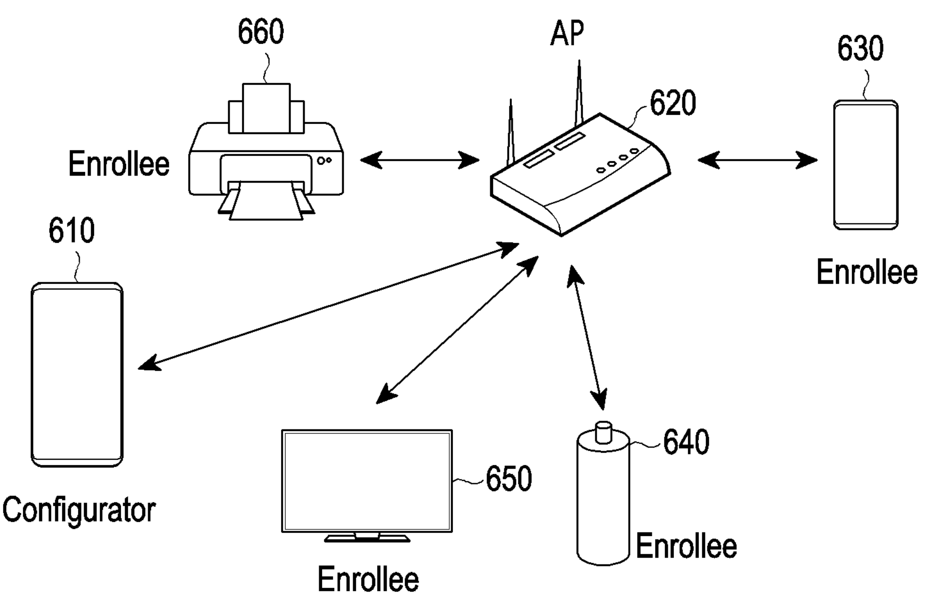
FIG. 6 schematically illustrates a network connection operation in a DPP network according to an embodiment of the disclosure.

FIG. 6 schematically illustrates a network connection operation in a DPP network according to an embodiment of the disclosure.

Referring to FIG. 6, DPP devices may be enrolled in the DPP network, and a corresponding enrollee client among the DPP devices may search for the DPP network through an AP (620), based on a configuration for connection for the DPP network, acquired in an enrollment procedure, and may connect to the found DPP network. In an embodiment of the disclosure, the DPP network may include various electronic devices, for example, an electronic device (for example, the electronic device 101) and one or more external electronic devices (for example, a first external electronic device 620, a second external electronic device 630, a third external electronic device 640, a fourth external electronic device 650, and a fifth external electronic device 660). Referring to FIG. 6, the electronic device 101 may operate as a configurator, the first external electronic device 620 may operate an enrollee AP, and each of the second external electronic device 630, the third external electronic device 640, the fourth external electronic device 650, and the fifth external electronic device 660 may operate as an enrollee STA.

In an embodiment of the disclosure, the first external electronic device 620 may be configured as an enrollee AP by the electronic device 101, and at least one of the second external electronic device 630, the third external electronic device 640, the fourth external electronic device 650, and the fifth external electronic device 660 may be configured as an enrollee STA by the electronic device 101, search for the DPP network through the first external electronic device 620, and connect to the found DPP network.

The WFA provides Wi-Fi Easy Connect so that an operation of adding a Wi-Fi device in a Wi-Fi network can be performed much simply and efficiently. The Wi-Fi Easy Connect supports a bootstrapping mechanism, and the bootstrapping mechanism may be a mechanism which enables a configurator and an enrollee to be safely added to the Wi-Fi network while minimizing an operation by a user for each Wi-Fi device. The Wi-Fi Easy Connect may use an enrollee QR code to support the bootstrapping mechanism.

In an embodiment of the disclosure, the QR code may include, for example, various types of information, such as a secure key and a unique identifier of the Wi-Fi device. The QR code may be recognized by the Wi-Fi device including a QR code scan function, and can prevent inconvenience which may occur when the user directly inputs information for Wi-Fi device authentication. Alternatively, the QR code can also prevent an issue which may occur due to a data input error.

An example of a provision operation using a configurator and a QR code in a Wi-Fi Easy Connect network is described.

(1) The configurator may scan a QR code of an enrollee by using a camera that the configurator has. For example, the QR code may be provided in the form of a card or a sticker attached to a device of the enrollee, or may be displayed through a display screen of the enrollee.

(2) The configurator may read the QR code, interpret the same to automatically search for the enrollee and a safe Wi-Fi communication link, and configure the enrollee and the safe Wi-Fi communication link, based on a search result.

(3) The configurator may configure Wi-Fi network information for the enrollee by using a secure channel.

(4) Once the configuration of the Wi-Fi network information for the enrollee is completed, the enrollee may search for, by using the Wi-Fi network information provided by the configurator, the Wi-Fi network without involvement of the user, select a specific Wi-Fi network, based on a search result, and perform a connection operation for the selected Wi-Fi network.

In the Wi-Fi Easy Connect network, when the configurator has no function for recognizing the QR code or the enrollee has not function for displaying the QR code, the user may directly input a string to enable configuration of a Wi-Fi communication link between the configurator and the enrollee.

The Wi-Fi Easy Connect technology is designed with flexibility so that Wi-Fi devices perform provisioning in various schemes, and may support initiation of a provisioning operation by the configurator or the enrollee. As shown in the above-described example of the provisioning operation, the Wi-Fi device operating as the configurator, for example, a smartphone may scan the QR code of the Wi-Fi device operating as the enrollee, for example, an IoT device, and may include the QR code of the IoT device in the Wi-Fi network information to be provisioned.

In an embodiment of the disclosure, the configurator may provide the QR code of the enrollee for Wi-Fi configuration provisioning. For example, in a Wi-Fi network of a hotel, a configurator may provide a QR code of an enrollee, for example, a TV in a hotel room. Then, a customer may scan the QR code provided through the TV in the hotel room, by using a smartphone used to perform a provisioning operation, and accordingly, the provisioning operation as described above. For example, the smartphone of the customer may be onboarded to the Wi-Fi network.

The provisioning process proposed in the DPP may include a total of four operations, that is, a DPP bootstrapping operation, a DPP authentication operation, a DPP configuration operation, and a DPP access operation. In an embodiment of the disclosure, the DPP access operation may be also referred to as a peer discovery operation. In an embodiment of the disclosure, in three operations including the DPP bootstrapping operation, the DPP authentication operation, and the DPP configuration operation, the electronic device may operate as a configurator, and at least one external electronic device may operate as an enrollee. In an embodiment of the disclosure, the configurator may perform an operation of configuring electronic devices connected to the DPP network as described above.

In an embodiment of the disclosure, an AP corresponding to an enrollee may perform an operation of providing an access to the network as described above. In an embodiment of the disclosure, the enrollee may be an enrollee client or an enrollee AP, and when the network configuration is completed, the enrollee may operate as the enrollee client (i.e., the enrollee STA) to be connected the AP and access the network, or may operate as the enrollee AP to provide an access to the network.

The DPP bootstrapping operation, DPP authentication operation, DPP configuration operation, and DPP access operation are described as follows.

The DPP bootstrapping operation is described as follows.

In the DPP bootstrapping operation, to configure a secure provisioning connection, the DPP devices may exchange public bootstrapping keys. In an embodiment of the disclosure, the public bootstrapping keys may be secure information used in the DPP bootstrapping operation.

As a detailed description thereof, an identifier (ID) is applied to the DPP device, and as the ID allocated to the DPP device, a QR code or a string (print or digital) which can be read by the user is included in the form of a public key and a private key. In the DPP bootstrapping operation, the configurator and the enrollee may perform mutual authentication by configuring a reliable relationship, and may configure a secure connection, based on a result of the mutual authentication.

In an embodiment of the disclosure, as described above, in the DPP bootstrapping operation, public bootstrapping keys are exchanged, and the public bootstrapping keys may be transmitted in one direction only or exchanged in both directions according to whether the mutual authentication between the configurator and the enrollee is required. In the DPP bootstrapping operation, the public bootstrapping keys may be exchanged based on, for example, various schemes, such as a QR code scheme, a Bluetooth scheme, a Bluetooth low energy (BLE) scheme, a near field communication (NFC) scheme, a public key exchange (PLEX) scheme, or a cloud scheme.

In an embodiment of the disclosure, after the public bootstrapping keys are exchanged, a connection may be configured between the configurator and the enrollee. In an embodiment of the disclosure, the public bootstrapping keys may be different from security credentials received by the enrollee in the DPP configuration operation after the DPP bootstrapping operation. In an embodiment of the disclosure, the bootstrapping information may be used in the DPP authentication operation and the DPP configuration operation after the DPP bootstrapping operation, and a medium access control (MAC) address and a small list of global operating class/channel pairs may be included. In an embodiment of the disclosure, the small list of the global operating class/channel pairs may include ideally one channel only.

The DPP authentication operation and the DPP configuration operation are described as follows.

In the DPP authentication operation, the DPP devices may configure a reliable and safe channel by using the bootstrapping keys in the DPP authentication protocol, and in the DPP configuration operation, the configurator may execute a DPP configuration protocol to provision the enrollee through the secure channel configured during the DPP authentication operation. A detailed description thereof is made as follows.

Once the DPP bootstrapping operation is completed, the configurator and the enrollee may configure the secure Wi-Fi connection by using the DPP authentication protocol. In the DPP authentication operation and the DPP configuration operation, the configurator corresponding to an initiator may request authentication from the enrollee corresponding to a responder, based on the channel information acquired through the DPP bootstrapping operation. For example, the configurator may transmit a DPP authentication request frame to request authentication. In an embodiment of the disclosure, the DPP authentication request frame may include at least one of a hash for a public bootstrapping key of a responder, a hash for a public bootstrapping key of an initiator, a public protocol key of an initiator, an initiator nonce attribute encrypted as a first intermediate key, or an initiator capabilities attribute encrypted as a first intermediate key. In an embodiment of the disclosure, the secure information used in the DPP authentication operation may include at least one of the hash for the public bootstrapping key of the responder, acquired from the DPP authentication request frame, the hash for the public bootstrapping key of the initiator, the public protocol key of the initiator, the initiator nonce attribute encrypted as the first intermediate key, and the initiator capabilities attribute encrypted as the first intermediate key.

In an embodiment of the disclosure, the enrollee may respond to the authentication request of the configurator while waiting for the corresponding channel, based on the channel information acquired through the DPP bootstrapping operation. For example, the enrollee may respond to the authentication request by transmitting the DPP authentication response frame to the configurator. In an embodiment of the disclosure, the DPP authentication response frame may include at least one of a hash for a public bootstrapping key of a responder, a hash for a public bootstrapping key of an initiator, a public protocol key of a responder, or a responder nonce attribute, a responder capabilities attribute, or an initiator capabilities attribute, encrypted as a second intermediate key. In an embodiment of the disclosure, the secure information used in the DPP authentication operation may include at least one of the hash for the public bootstrapping key of the responder, the hash for the public bootstrapping key of the initiator, the public protocol key of the responder, the responder nonce attribute encrypted as the second intermediate key, the responder capabilities attribute encrypted as the second intermediate key, or the initiator capabilities attribute encrypted as the second intermediate key, acquired from the DPP authentication response frame.

In an embodiment of the disclosure, as the DPP authentication operation is completed, a secure connection may be configured between the configurator and the enrollee, and after the secure configuration is configured, the enrollee may start a transaction for acquiring the network configuration information from the configurator. For example, the responder may transmit a DPP configuration request frame, and the configurator may transmit a DDP configuration response frame responding to the DDP configuration request frame. The responder may verify the network information and configuration information acquired through the DPP configuration protocol, and transmit a result of the verification to the configurator. As such a DPP configuration operation is completed, the configurator may operate as an AP, or may search for a target AP to be safely connected to the found target AP.

In an embodiment of the disclosure, the encoded configuration information transmitted or received in the DPP configuration information may include a DPP configuration object, and the DPP configuration object may include the following DPP configuration object parameters. The DPP configuration object may be a JavaScript object notation (JSON)-encoded data structure. In an embodiment of the disclosure, the DPP configuration object may be referred to as network configuration information.

(1) Wi-Fi Technology Object

A Wi-Fi technology object may identity a Wi-Fi technology of a policy to be provisioned, and the Wi-Fi technology object may indicate a connection type, such as an AP infra-connection. In an embodiment of the disclosure, the enrollee may configure a value of the Wi-Fi technology object included in the DDP configuration request frame, and the configurator may configure a value of the Wi-Fi technology object included in the DPP configuration response frame as a value indicating a Wi-Fi technology used in the operation between the enrollee and the configurator. In an embodiment of the disclosure, the Wi-Fi technology object may indicate a Wi-Fi technology to be used in the DPP authentication operation, the DPP configuration operation, etc.

(2) DPP Discovery Object

A DPP discovery object may include, for example, an operation, such as a service set identifier (SSID), an operating channel, or an operating band, and discovery information.

(3) Credential Object

A credential object may include security credential information (or referred to as credential information) provisioned by the enrollee to acquire a secure network access. The credential information may be dependent on a value of an authentication and key management (AKM) type parameter included in the DPP configuration object.

In the DPP configuration operation, the security credential information and the network configuration information including the network information, such as the SSID, for example, the DPP configuration object may be transmitted from the configurator to the enrollee. In an embodiment of the disclosure, the security credential information may include connector information, and the connector information is information provisioned by the enrollee, and may be used by a pair of enrollees and used to configure a security association by using the DPP network introduction protocol.

In an embodiment of the disclosure, the connector information is a credential signed by the configurator, and may be used when the enrollee client connects to the enrollee AP. In an embodiment of the disclosure, the configurator may possess a c-sign-key and a C-sign-key corresponding to a signing key pair, wherein the c-sign-key may be used when the configurator signs the connector information, and the C-sign-key may be used when the provisioned DPP devices verify the connector information of other DPP devices signed by the same configurator.

The connector information of each enrollee may include a public key, a network role, and group attribute information, and may be signed by the configurator. The public key may provide an ID of the enrollee. The network role may indicate whether the enrollee is an enrollee client (or an enrollee STA) or an enrollee AP. The group attribute information may be used to detect whether the enrollee may configure the network connection. A connector signature may guarantee that connector contents are generated by the configurator. The connector information includes the public key rather than the passphrase, and thus the security credential information may vary for each Wi-Fi device, i.e., for each enrollee. For example, the enrollee cannot access a network by using the connector information of another enrollee, and the enrollee corresponding to the connector information belongs to a specific AP, it may mean that another AP cannot pretend to be the specific AP.

In an embodiment of the disclosure, the enrollee client may search for an enrollee AP, based on the network information. The enrollee client may perform an authentication operation based on the connector information, and may configure a network connection based on a network introduction (NI) protocol. The advantage in a case of using the connector information may be that each enrollee connected to the AP has unique security credential information.

Figure 7:
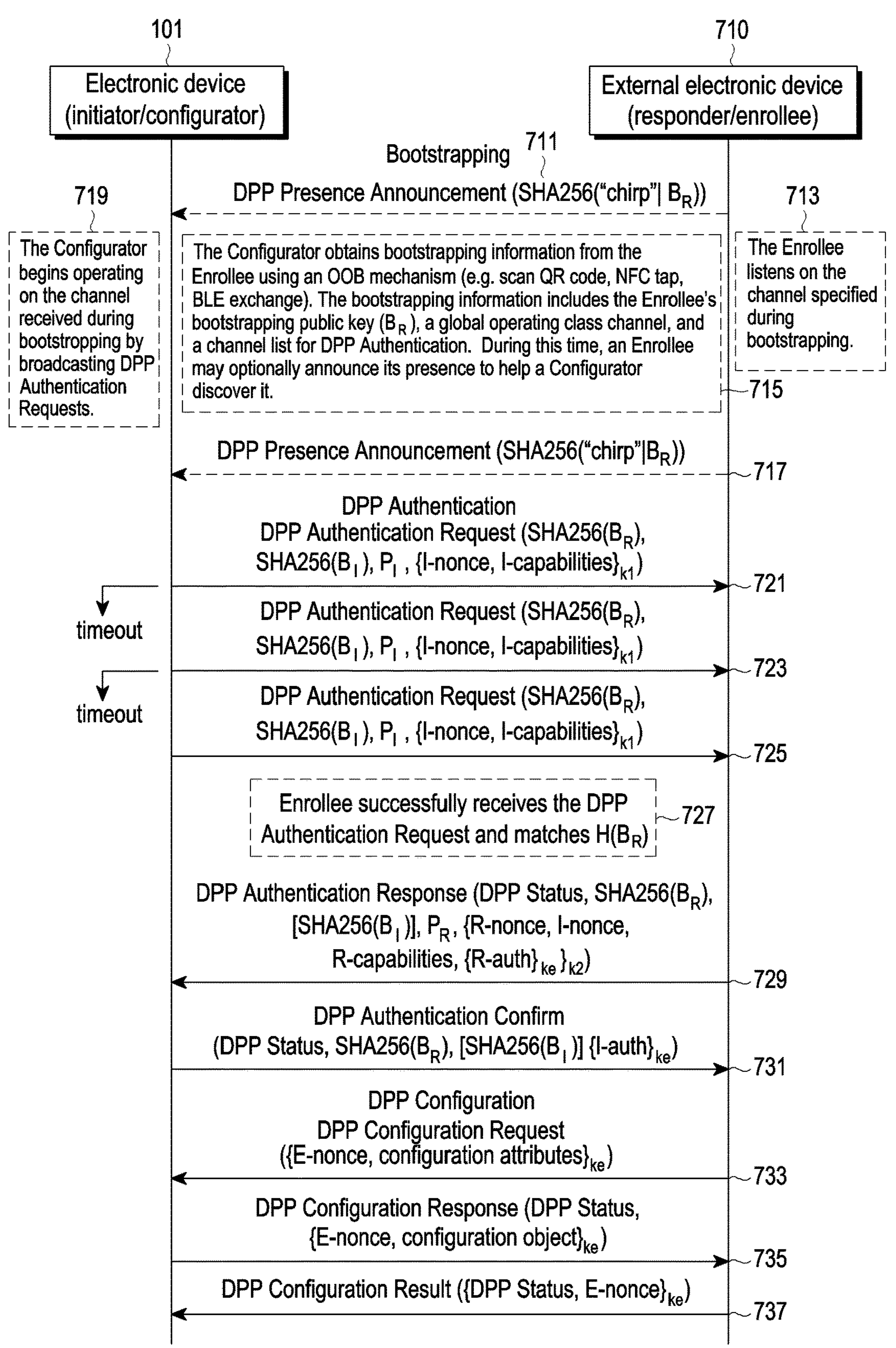
FIG. 7 schematically illustrates a provisioning process in a DPP network according to an embodiment of the disclosure.

FIG. 7 schematically illustrates a provisioning process in a DPP network according to an embodiment of the disclosure.

Here, each of the electronic device 101 and an external electronic device 710 included in the DPP network may be a DPP device, and the electronic device 101 may operate as both a configurator and an initiator, and the external electronic device 710 may operate as both an enrollee and a responder. The external electronic device 710 may be one of the external electronic devices operating as the enrollee, for example, the external electronic device 320 or 330 of FIG. 3, the external electronic device 420 of FIG. 4, the external electronic device 520, 530, 540, or 550 of FIG. 5, or the external electronic device 620, 630, 640, 650, or 660 of FIG. 6. Hereinafter, operations 711 to 717 may mean a DPP bootstrapping procedure, operations 721 to 731 may mean a DPP authentication procedure, and operations 733 to 737 may mean a DPP configuration procedure. The DPP bootstrapping procedure may be performed by a signal flow shown in operations 711 and 717, or may be performed by an external means, like the use of the QR code, as described above. When the external means such as the QR code is used, the signal flow of operations 711 and 717 may be omitted.

Referring to FIG. 7, in operation 711, the external electronic device 710 operating as both an enrollee and a responder may transmit a DPP presence announcement frame. In an embodiment of the disclosure, the DPP presence announcement frame may be used to signal, to the electronic device 101 corresponding to the configurator, that the external electronic device 710 is ready to participate in DPP exchange, and may include a hash including a public bootstrapping key of the external electronic device 710. In an embodiment of the disclosure, the hash including the public bootstrapping key of the external electronic device 710 may be secure information used in the DPP bootstrapping operation. In an embodiment of the disclosure, to prevent leakage of the hash of the public key of the unprovisioned device, the hash for the DPP presence announcement frame may be SHA256("chirp"|BR). In an embodiment of the disclosure, the BR may indicate a responder, for example, a public bootstrapping key of the external electronic device 710.

In operation 713, the external electronic device 710 may perform a listening operation in a specified channel during the DPP bootstrapping operation. In operation 715, the electronic device 101 may acquire bootstrapping information from the external electronic device 710 by using an out-of-band (00B) mechanism, for example, QR code scanning, NFC tapping, or BLE exchange. In an embodiment of the disclosure, the bootstrapping information may include a public bootstrapping key (BR) of the external electronic device 710, a global operating class channel, and/or a channel list for DPP authentication. In an embodiment of the disclosure, during the DPP bootstrapping operation, to optionally announce the presence of the external electronic device 710 to help the electronic device 101 to discover the external electronic device 710, the external electronic device 710 may transmit a DPP presence announcement frame in operation 717. For example, the external electronic device 710 may periodically transmit a DPP presence announcement frame.

In operation 719, the electronic device 101 may determine to start an operation in a channel based on channel information received during bootstrapping. Accordingly, in operations 721, 723, and 725, the electronic device 101 may repeatedly broadcast a DPP authentication request frame. In an embodiment of the disclosure, the DPP authentication request frame may include SHA256 ($B_R$), SHA256 ($B_I$), $P_I$, and $\{$I-nonce, I-capabilities$\}_{k1}$. For example, SHA256($B_R$) may indicate an SHA256 hash for the $B_R$, $B_I$ may indicate a public bootstrapping key of the electronic device 101, SHA256($B_I$) may indicate a SHA256 hash for the $B_I$, $P_I$ may indicate a public protocol key of the electronic device 101, I-nonce may indicate an initiator nonce attribute, I-capabilities may indicate an initiator capabilities attribute, and k1 may indicate a first intermediate key. In an embodiment of the disclosure, {I-nonce, I-capabilities} may indicate I-nonce and I-capabilities which are encrypted with k1. In an embodiment of the disclosure, at least one of SHA256($B_R$), SHA256($B_I$), $P_I$, or $\{$I-nonce, I-capabilities$\}_{k1}$, included in the DPP authentication request frame, may be secure information used in the DPP authentication operation.

When the electronic device 101 repeatedly broadcasts DPP authentication request frames (for example, in operations 721, 723, and 725) and the external electronic device 710 successfully receives the DPP authentication request frame (for example, in operation 725), the electronic device 101 may end the DPP presence announcement and proceed to the authentication and configuration procedure. To perform the authentication procedure in operation 727, the external electronic device 710 may identify that H($B_R$) corresponding to a hash function value for the $B_R$ is matched to the SHA256 hash in the received DPP authentication request frame. In operation 729, the external electronic device 710 may transmit, to the electronic device 101, a DPP authentication response frame responding to the DPP authentication request frame. In an embodiment of the disclosure, the DPP authentication response frame may include a DPP status field, SHA256($B_R$), [SHA256($B_I$)], PR and/or $\{$R-nonce, I-nonce, R-capabilities, $\{$R-auth$_{ke}\}_{k2}$. For example, PR indicates a public protocol key of the external electronic device 710, R-nonce indicates a responder nonce attribute, R-capabilities indicates a responder capabilities attribute, R-auth indicates a responder, for example, an authentication tag of the external electronic device 710, ke indicates an encryption key, k2 indicates a second intermediate key, and [SHA256($B_I$)] indicates a value that is optionally present. For example, [SHA256($B_I$)] may be optionally included in the DPP authentication response frame or may be included in the DPP authentication response frame if a specific condition is satisfied.

In an embodiment of the disclosure, $\{$R-auth$\}_{ke}$ may represent R-auth encrypted with ke. In an embodiment of the disclosure, $\{$R-nonce, I-nonce, R-capabilities, $\{$R-auth$\}_{ke}\}_{k2}$ may represent R-nonce, I-nonce, R-capabilities, and $\{$R-auth$\}_{ke}$ which are encrypted with k2. In an embodiment of the disclosure, at least one of SHA256(BR), [SHA256 (BI)], PR, or $\{$R-nonce, I-nonce, R-capabilities, $\{$R-auth$\}_{ke}\}_{k2}$ included in the DPP authentication response frame may be secure information used in the DPP authentication operation.

In an embodiment of the disclosure, the DPP status field included in the DPP authentication response frame may indicate one of the states shown in Table 1 below.

TABLE 1

| Status or Error | Value | Meaning |
|---|---|---|
| STATUS_OK | 0 | No errors or abnormal behavior |
| STATUS_NOT_COMPATIBLE | 1 | The DPP Initiator and Responder have incompatible capabilities |
| STATUS_AUTH_FAILURE | 2 | Authentication failed |
| STATUS_BAD_CODE | 3 | The code used in PKEX is bad |
| STATUS_BAD_GROUP | 4 | An unsupported group was offered |
| STATUS_CONFIGURE_FAILURE | 5 | Configurator refused to configure Enrollee |
| STATUS_RESPONSE_PENDING | 6 | Responder will reply later |
| STATUS_INVALID_CONNECTOR | 7 | Received Connector is invalid for some reason. The sending device needs to be reconfigured. |
| STATUS_NO_MATCH | 8 | Received Connector is verified and valid but no matching Connector could be found. The receiving device needs to be reconfigured. |
| STATUS_CONFIG_REJECTED | 9 | Enrollee rejected the configuration. |
| STATUS_NO_AP | 10 | Enrollee failed to discover an access point. |
| STATUS_CONFIGURE_PENDING | 11 | Configuration response is not ready yet. The enrollee needs to request again. |
| STATUS_CSR_NEEDED | 12 | Configuration requires a Certificate Signing Request. The enrollee needs to request again. |
| STATUS_CSR_BAD | 13 | The Certificate Signing Request was invalid. |
| STATUS_NEW_KEY_NEEDED | 14 | The Enrollee needs to generate a new Protocol key. |

In operation 731, the electronic device 101 having received the DPP authentication response frame from the external electronic device 710 may transmit a DPP authentication confirm frame to the external electronic device 710. In an embodiment of the disclosure, the DPP authentication confirm frame may include a DPP status field, SHA256($B_R$), [SHA256($B_I$)], and $\{$I-auth$\}_{ke}$. In an embodiment of the disclosure, I-auth may indicate an initiator, for example, an authenticating tab of the electronic device 101, and ke may indicate an encryption key. In an embodiment of the disclosure, $\{$I-auth$\}_{ke}$ may indicate I-auth encrypted with ke.

In operation 733, the external electronic device 710 having received the DPP authentication confirm frame from the electronic device 101 may transmit a DPP configuration request frame from the electronic device 101. In an embodiment of the disclosure, the DPP configuration request frame may include $\{$E-nonce, configuration attributes$\}_{ke}$. In an embodiment of the disclosure, E-nonce may indicate an E-nonce attribute, and configuration attributes may indicate configuration attribute objects. The configuration attribute object may include at least one of a device name attribute, a Wi-Fi technology attribute, or a network role attribute. In an embodiment of the disclosure, $\{$E-nonce, configuration attributes$\}_{ke}$ may indicate E-nonce and configuration attributes encrypted with ke.

In operation 735, the electronic device 101 having received the DPP configuration request frame may transmit a DPP configuration response frame responding to the DPP configuration request frame to the external electronic device 710. In an embodiment of the disclosure, the DPP configuration response frame may include a DPP status field and $\{$E-nonce, configuration object$\}_{ke}$. In an embodiment of the disclosure, the configuration object may indicate configuration information including the DPP configuration object. In an embodiment of the disclosure, $\{$E-nonce, configuration object$\}_{ke}$ may indicate the E-nonce and configuration object encrypted with ke. In an embodiment of the disclosure, the configuration objects included in the DPP configuration response frame may include a Wi-Fi technology object, a discovery object, and/or a credential object.

In an embodiment of the disclosure, when the DPP protocol version is 2 or higher, the electronic device 101 may include a sendConnStatus attribute in the DPP configuration response frame transmitted in operation 735, to request, from the external electronic device 710, provision of feedback on a configuration attempt applied to a configuration object successfully transferred through the DPP. When the configuration according to configuration object is successfully applied, an enrolled device 900 may search for an AP by using the configuration object and attempt to establish connection. When sendConnStatus is included in the received DPP configuration response frame, the external electronic device 710 may transmit, in operation 737, a DPP configuration result frame including the E-nonce and the DPP status field indicating the status on the connection attempt. In an embodiment of the disclosure, DPP configuration result frame may include $\{$DPP Status, E-nonce$\}_{ke}$. DPP Status, E-nonce$\}_{ke}$ may indicate the E-nonce and DPP status field encrypted with ke.

Hereinafter, the DPP access operation in the provisioning process is described.

A network introduction protocol is used so that an enrollee client may be securely connected to an enrollee AP by using connector information provided by a configurator, and a DPP access operation which is based on the network introduction protocol may be as follows.

(1) Each of enrollee clients and an enrollee AP may identify whether connector information of each of the enrollee clients is signed by the configurator.

(2) Each of the enrollee clients may identify that a role of each of the enrollee clients is compatible and establish communication with the enrollee AP.

(3) The enrollee clients may identify whether group attributes are matched.

(4) The enrollee AP and each of the enrollee clients may derive a pairwise master key (PMK), based on a public connector key.

(5) A connection may be established between the enrollee AP and the enrollee clients, based on the derived PMK.

Figure 8:
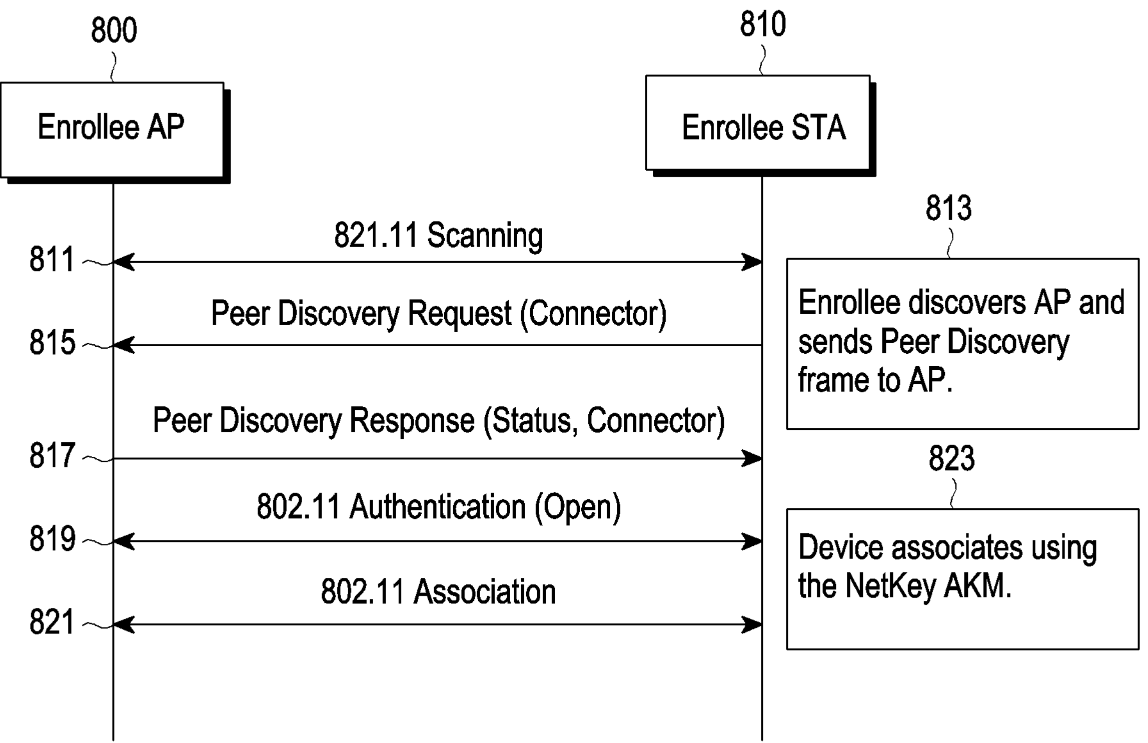
FIG. 8 is a signal flow diagram schematically illustrating a network access operation using connector information according to an embodiment of the disclosure.

FIG. 8 is a signal flow diagram schematically illustrating a network access operation using connector information according to an embodiment of the disclosure.

Here, it is assumed that a first electronic device operates as an enrollee AP 800, and a second electronic device operates as an enrollee STA 810. In an embodiment of the disclosure, the enrollee AP 800 may be an electronic device 101. In an embodiment of the disclosure, the enrollee STA 810 may be an electronic device 101.

Referring to FIG. 8, in operation 811, the enrollee STA 810 may perform Wi-Fi scanning, for example, an IEEE 802.11 scanning operation based on the IEEE 802.11 standard. In operation 813, the enrollee STA 810 may discover the enrollee AP 800 upon performing the IEEE 802.11 scanning operation. In operation 815, the enrollee STA 810 may transmit a peer discovery request frame including a connector attribute to the discovered enrollee AP 800. The enrollee AP 800 may receive the peer discovery request frame from the enrollee STA 810, and transmit, to the enrollee STA 810, a peer discovery response frame as a response to the peer discovery request frame in operation 817. In an embodiment of the disclosure, the peer discovery response frame may be included in the connector attribute and a status attribute, the status attribute may indicate a DPP status attribute.

When the peer discovery response frame is received from the enrollee AP 800, the enrollee STA 810 may perform the IEEE 802.11 authentication operation based on the IEEE 802.11 standard with the enrollee AP 800 in operation 819. In operation 821, the enrollee STA 810 may perform an IEEE 802.11 association operation based on the IEEE 802.11 standard with the enrollee AP 800. In operation 823, the enrollee STA 810 may be associated with the enrollee AP 800 by using authentication and key management (AKM) corresponding to a network key.

A DPP connection status result according to various embodiments of the disclosure is described as follows.

According to an embodiment of the disclosure, when both the enrollee and the configurator use the DPP of a specific protocol version, for example, protocol version 2 or higher and the DPP configuration operation between the configurator and the enrollee is successfully, the configurator may request the enrollee to provide feedback on an attempt to use a configuration applied to a DPP configuration object received through the successful DPP configuration operation.

According to an embodiment of the disclosure, the feedback request may be used when the enrollee is the enrollee STA, and the configurator may include, in the DPP configuration response frame, a sendConnStatus attribute corresponding to an attribute requesting to transmit the connection status, thereby receiving feedback on the attempt to use the configuration applied to the DPP configuration object received through the successful DPP configuration operation from the enrollee when the DPP configuration operation between the configurator and the enrollee is successful.

In an embodiment of the disclosure, the enrollee having received the DPP configuration response frame may discover the AP to which the enrollee is to connected based on the DPP configuration object included in the DPP configuration response frame, and may attempt to connect to the discovered AP. When the sendConnStatus attribute is included in the DPP configuration response frame, the enrollee may transmit, to the configurator, a DPP configuration result frame which confirms receipt of the DPP configuration object through the DPP configuration response frame and the status for attempt on the connection to which the configurator applies the DPP configuration object.

In an embodiment of the disclosure, the status of the attempt on the connection to which the DPP configuration object is applied may be indicated through a DPP connection status object in the DPP configuration result frame, and a DPP status value which may be included in the DPP connection status object is as shown in Table 2 below.

TABLE 2

| Connection Attempt Result | DPP Status |
|---|---|
| Enrollee successfully associated to the AP and has network access | STATUS_OK |
| Enrollee discovered the AP and failed to connect to the network. | STATUS_AUTH_FAILURE |
| Enrollee received an invalid connector during network introduction. | STATUS_INVALID_CONNECTOR |
| Received AP Connector is verified and valid but no matching Connector could be found by Enrollee. | STATUS_NO_MATCH |
| Enrollee failed to discover an access point. | STATUS_NO_AP |

Referring to Table 2, if an enrollee is successfully associated with an AP and has a network access, a DPP status value may be set to "STATUS_OK". If the enrollee has discovered the AP but has failed to connect to a network, the DPP status value may be set to "STATUS_AUTH_FAILURE". The DPP status value may be set to "STATUS_INVALID_CONNECTOR" if the enrollee receives an invalid connector during network introduction. If a received AP connector is verified and valid, but no matching connector is detected by the enrollee, the DPP status value may be set to "STATUS_NO_MATCH". In Table 2, if the enrollee fails to discover the AP, the DPP status value may be set to "STATUS_NO_AP".

Figure 9:
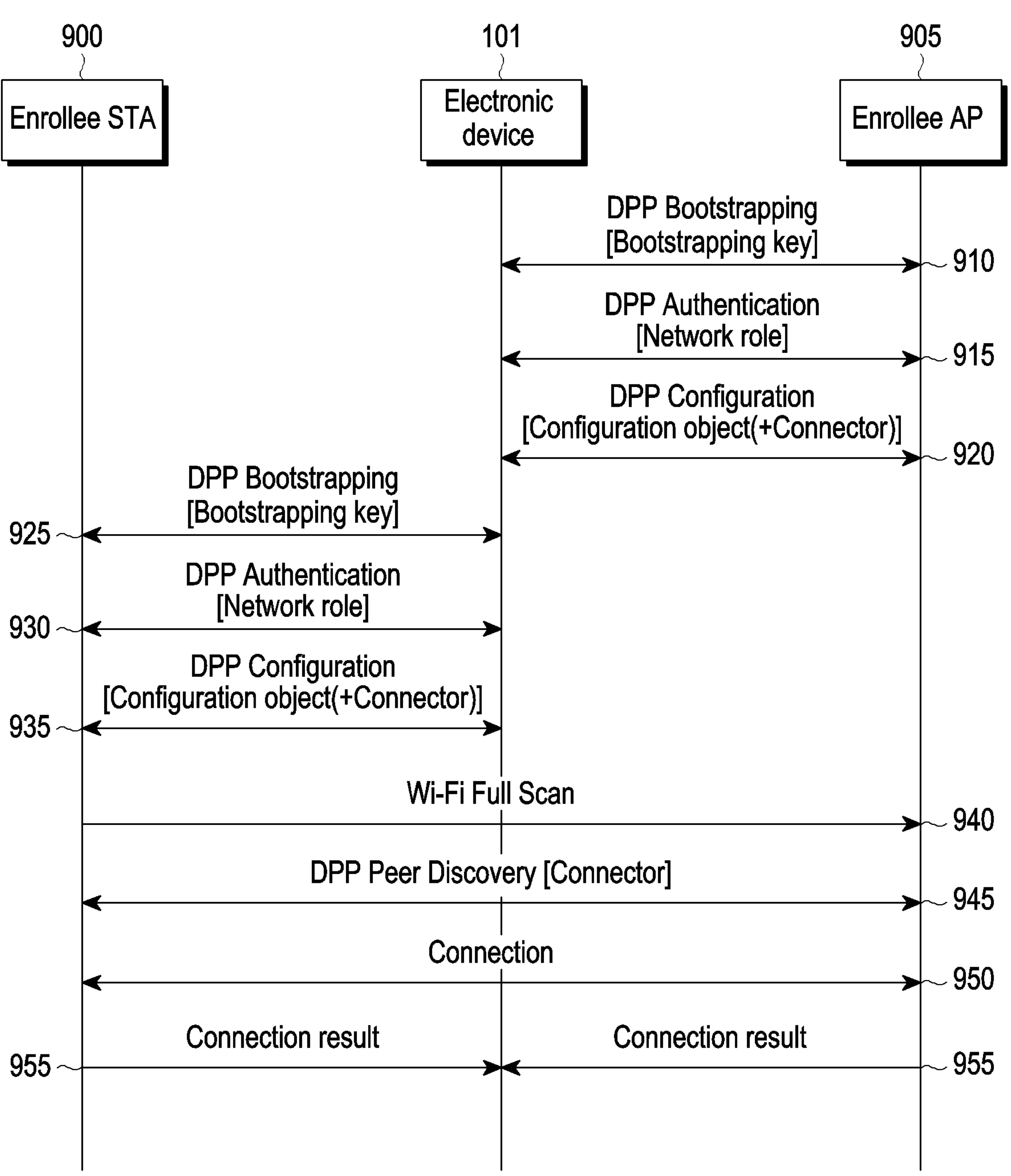
FIG. 9 schematically illustrates a process configuring an enrollee terminal and an enrollee access point (AP) in a DPP network according to an embodiment of the disclosure.

FIG. 9 schematically illustrates a process configuring an enrollee terminal and an enrollee AP in a DPP network according to an embodiment of the disclosure.

Referring to FIG. 9, each of an enrollee STA 900 and a enrollee AP 905 and the electronic device 101 included in the DPP network may be the DPP device, and the electronic device 101 may operate as a configurator for the enrollee STA 900 and the enrollee AP 905. The enrollee STA 900 is an external electronic device operating as a DPP configurator, which may be, for example, the external electronic device 320 of FIG. 3 or the external electronic device 630, 640, 650, or 660 of FIG. 6. The enrollee AP 905 is an external electronic device operating as a DPP enrollee, which may be, for example, the external electronic device 330 of FIG. 3, the external electronic device 420 of FIG. 4, or the external electronic device 620 of FIG. 6.

The electronic device 101 may acquire a bootstrapping key by performing DPP bootstrapping with an enrollee AP 905 in operation 910. In an embodiment of the disclosure, operation 910 may include at least one of operation 711, operation 713, operation 715, or operation 717 of FIG. 7. In operation 915, the electronic device 101 may perform DPP authentication with the enrollee AP 905. In an embodiment of the disclosure, operation 915 may include at least one of operation 721, operation 723, operation 725, operation 727, operation 729, or operation 731 of FIG. 7. Through the DPP authentication operation, a configuration role of the electronic device 101 and an enrollee role of the enrollee AP 905 may be determined. In operation 920, the electronic device 101 may configure the enrollee AP 905 through the DPP configuration operation. In the DPP configuration operation, the electronic device 101 may provide connector information and configuration information for configuring the enrollee AP 905 as an AP. In an embodiment of the disclosure, operation 920 may include at least one of operation 733, operation 735, or operation 737 of FIG. 7.

Similarly, the electronic device 101 may perform DPP bootstrapping in operation 925, DPP authentication in operation 930, and DPP configuration in operation 935 with the enrollee STA. The description of operations 925, 930, and 935 may be similar to operations 910, 915, and 920. In operation 930, the configurator role of the electronic device 101 and the enrollee role of the enrollee STA 900 through the DPP authentication operation. Here, it is illustrated that operations 910, 915, and 920 are performed before operations 925, 930, and 935, but operations 910, 915, and 920 may be performed after operations 925, 930, and 935, or at least some operations may be simultaneously performed.

When the electronic device 101 completes a configuration for the enrollee AP 905 through operations 910, 915, and 920, and completes configuration of the enrollee STA 900 through operations 925, 930, and 935, the enrollee AP 905 may perform an AP operation according to an AP configuration by the electronic device 101. In an embodiment of the disclosure, the AP operation may include an operation of periodically broadcasting a beacon signal in a channel configured by the electronic device 101.

In operation 940, the enrollee STA 900 may perform Wi-Fi scanning. In an embodiment of the disclosure, the enrollee STA 900 cannot identify information of nearby APs, and accordingly, may perform Wi-Fi full scanning of discovering all receivable channels. The enrollee STA 900 having discovered the enrollee AP 905 through the Wi-Fi full scanning may perform DPP peer discovery in operation 945. In an embodiment of the disclosure, the DPP peer discovery of operation 945 may include operations 815, 817, 819, and 821. After the DPP peer discovery, in operation 950, the enrollee STA 900 may establish a connection with the enrollee AP 905. In operation 955, each of the enrollee STA 900 and the enrollee AP 905 may report a connection result to the electronic device 101.

Figure 10:
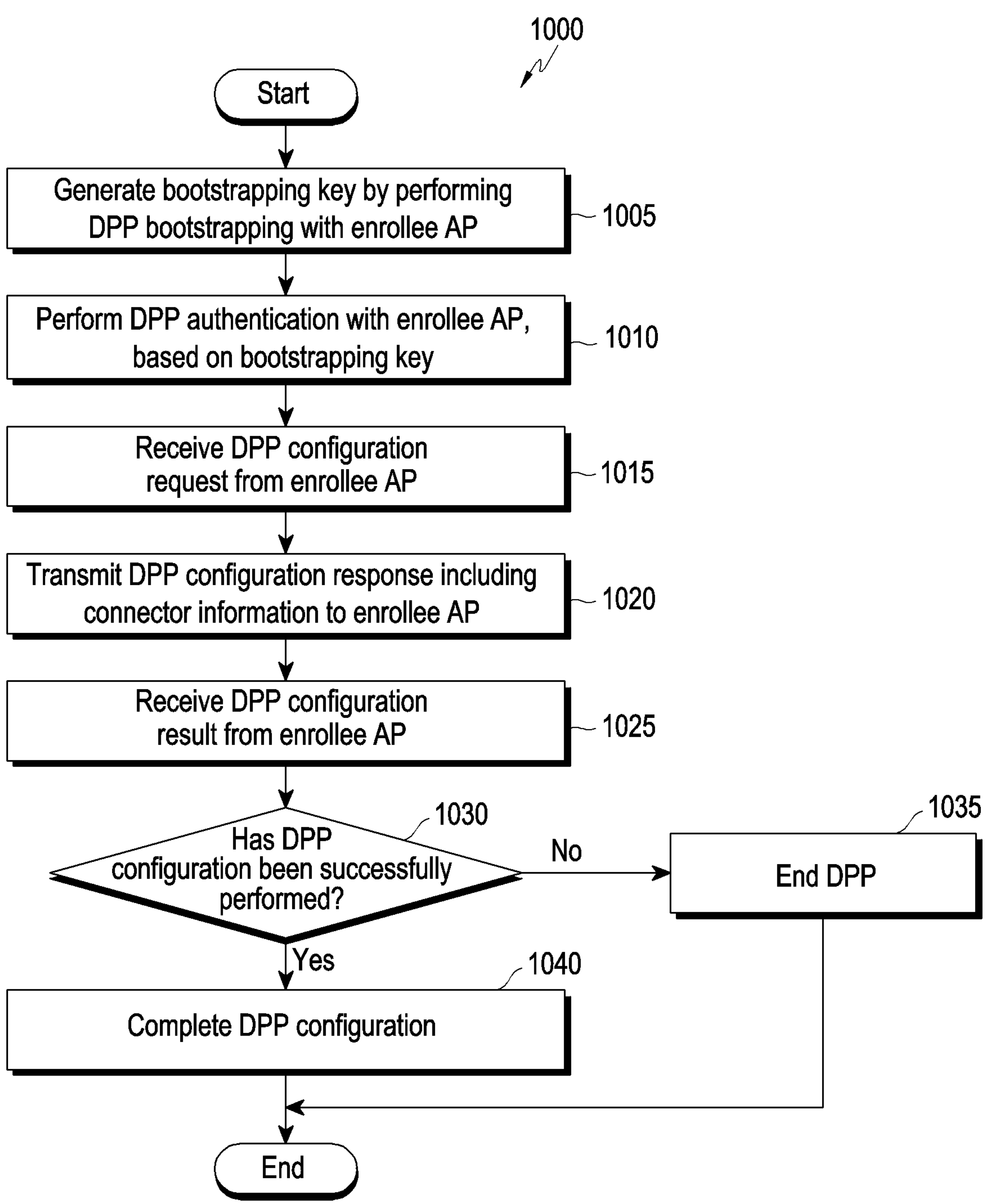
FIG. 10 is a flowchart illustrating a procedure in which an electronic device configures an enrollee AP according to an embodiment of the disclosure.

FIG. 10 is a flowchart illustrating a procedure 1000 in which an electronic device configures an enrollee AP according to an embodiment of the disclosure.

Referring to FIG. 10, in operation 1005, the electronic device 101 may generate a bootstrapping key by performing DPP bootstrapping with an enrollee AP 905 to configure an external electronic device as an enrollee AP 905. In operation 1010, the electronic device 101 may notify to the enrollee AP 905 that the electronic device 101 is a configurator, by performing DPP authentication with the enrollee AP 90, based on the generated bootstrapping key. When a DPP configuration request frame from the enrollee AP 905 is received in the electronic device 101 in operation 1015, the electronic device 101 may transmit, to the enrollee AP 905, a DPP configuration response frame including configuration information for configuring the enrollee AP 905 as an AP in operation 1020. The electronic device 101 may receive, in operation 1025, a DPP configuration result frame corresponding to the DPP configuration response frame from the enrollee AP 905, and may determine, in operation 1030, whether the DPP configuration result frame indicates success in DPP configuration. If the DPP configuration result frame does not indicate the success in DPP configuration, the electronic device 101 may end or restart the DPP procedure in operation 1035. On the other hand, if the DPP configuration result frame indicates the success in DPP configuration, the electronic device 101 may determine in operation 1040 that the DPP configuration for the enrollee AP 905 has been completed.

Figure 11:
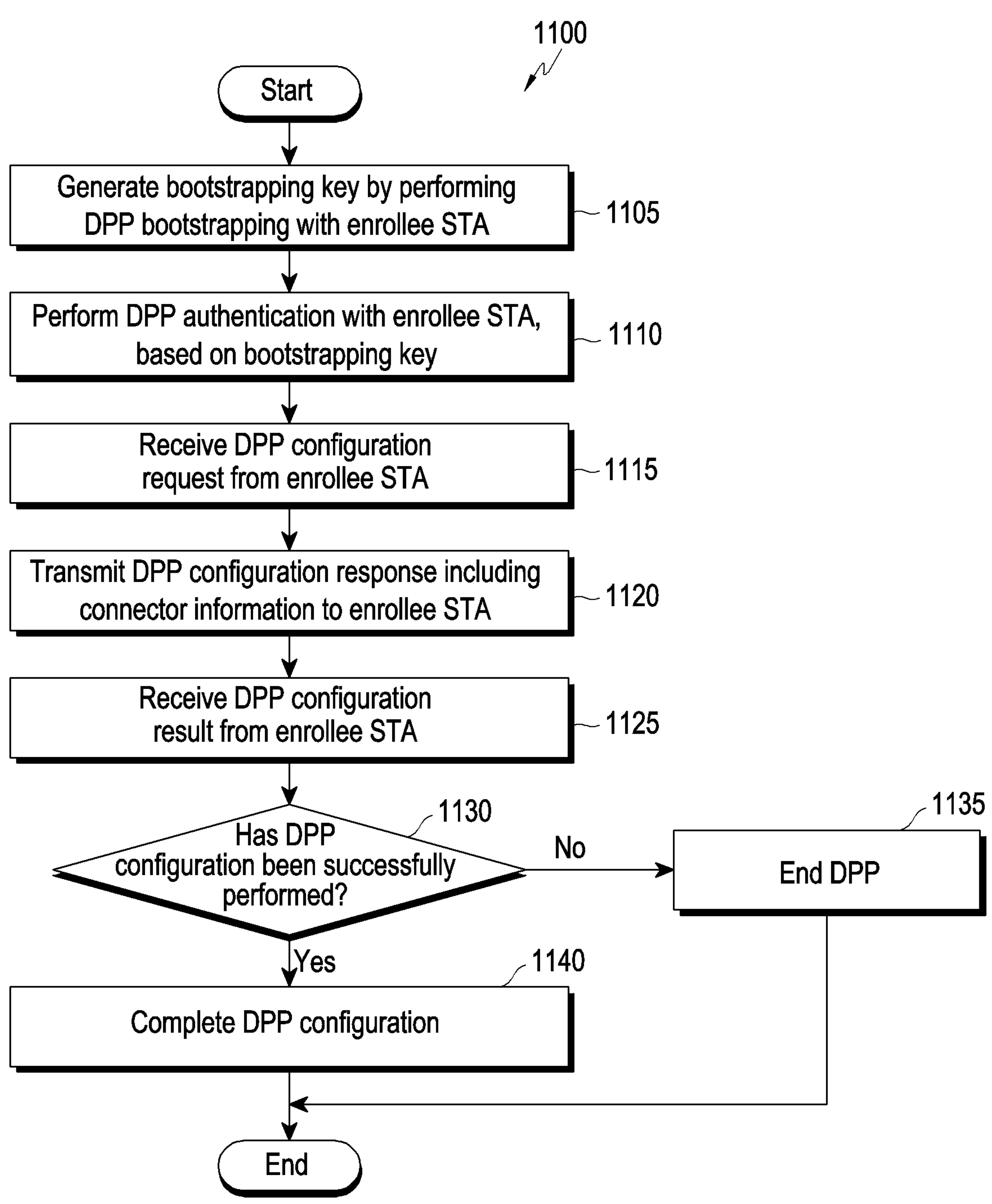
FIG. 11 is a flowchart illustrating a procedure in which an electronic device configures an enrollee terminal (STA) according to an embodiment of the disclosure.

FIG. 11 is a flowchart illustrating a procedure 1100 in which an electronic device configures an enrollee STA according to an embodiment of the disclosure.

Referring to FIG. 11, in operation 1105, the electronic device 101 may generate a bootstrapping key by performing DPP bootstrapping with an enrollee STA 900 to configure an external electronic device as an enrollee STA 900. In operation 1110, the electronic device 101 may notify to the enrollee STA 900 that the electronic device 101 is a configurator, by performing DPP authentication with the enrollee STA 900, based on the generated fbootstrapping key. When a DPP configuration request frame is received from the enrollee STA in operation 1115, the electronic device 101 may transmit, to the enrollee STA 900, a DPP configuration response frame including connector information and configuration information for configuring the enrollee STA 900 as a Wi-Fi client in operation 1120. The electronic device 101 may receive, in operation 1125, a DPP configuration result frame corresponding to the DPP configuration response frame from the enrollee STA, and may determine, in operation 1130, whether the DPP configuration result frame indicates success in DPP configuration. If the DPP configuration result frame does not indicate the success in DPP configuration, the electronic device 101 may end or restart the DPP procedure in operation 1135. On the other hand, if the DPP configuration result frame indicates the success in DPP configuration, the electronic device 101 may determine in operation 1140 that the DPP configuration for the enrollee STA 900 has been completed.

In an embodiment of the disclosure, instead of configuring external electronic devices as an enrollee STA and an enrollee AP, respectively, the electronic device 101 itself may operate as an enrollee STA or an enrollee AP. After the electronic device 101 operating as a configurator configures the enrollee AP, the electronic device may operate as the enrollee STA by itself, and connect to the enrollee AP. Similarly, after the electronic device 101 operating as a configurator configures the enrollee STA, the electronic device may operate as the enrollee AP by itself, and provide a connection to the enrollee STA.

In various embodiments of the disclosure, when the electronic device 101 accesses an enrollee AP while operating as a DPP configurator or operating as an enrollee STA, in order to connect to the enrollee AP, the procedure of connecting to the enrollee AP can be efficiently performed.

Figure 12:
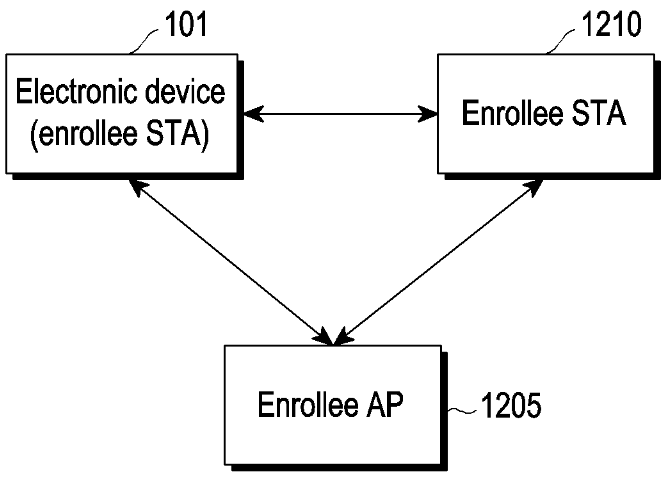
FIG. 12 illustrates a scenario in which an electronic device configures an enrollee AP and connect to an enrollee AP according to an embodiment of the disclosure.

FIG. 12 illustrates a scenario in which an electronic device configures an enrollee AP and connect to the enrollee AP according to an embodiment of the disclosure.

Referring to FIG. 12, the electronic device 101 may configure a newly purchased and installed external electronic device to operate as an enrollee AP 1205. The electronic device 101 may configure the enrollee AP 1205 while operating as a DPP configurator, and may access the enrollee AP 1205 by operating as the enrollee STA 101 when the configuration of the enrollee AP 1205 is completed. In an embodiment of the disclosure, the electronic device 101 may perform control to configure another external electronic device as an enrollee STA 1210, and connect to the enrollee AP 1205.

Figure 13:
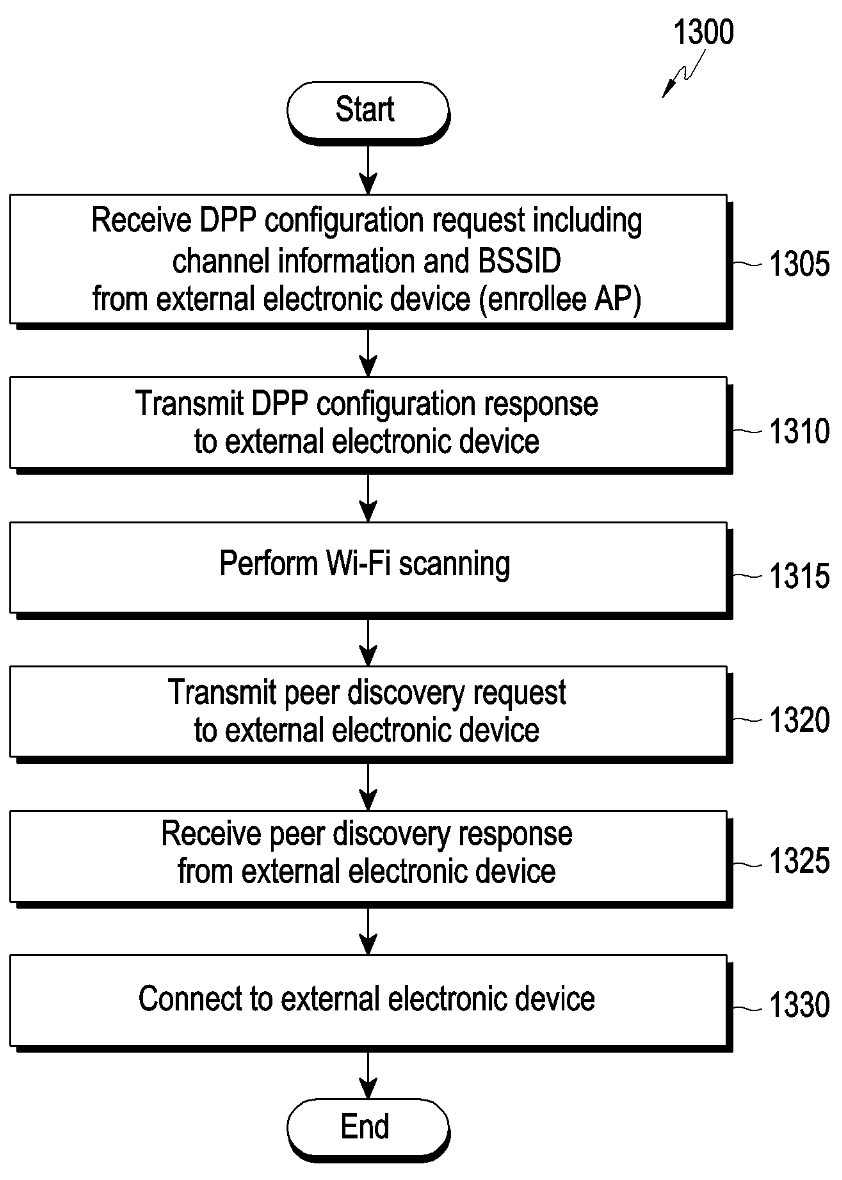
FIG. 13 is a flowchart illustrating a procedure of configuring an external electronic device as an enrollee AP and connecting thereto according to an embodiment of the disclosure.

FIG. 13 is a flowchart illustrating a procedure 1300 of configuring an external electronic device as an enrollee AP and connecting thereto according to an embodiment of the disclosure. At least some of the illustrated operations may be performed by at least one processor (for example, the processor 120) and a communication module (for example, the communication module 190) included in the electronic device 101.

Referring to FIG. 13, in operation 1305, the processor 120 may receive, from an external electronic device (for example, the enrollee AP 1205), a DPP configuration request frame including first channel information related to a channel in which the external electronic device may operate as an enrollee AP. In an embodiment of the disclosure, the first channel information may include a band support field and/or a band field indicating a frequency band in which the enrollee AP can operate. Here, the "band support" field may include a list of band parameters supported by the enrollee AP. Here, the "band" field may include an integer value indicating a frequency band in which the enrollee AP operates. In an embodiment of the disclosure, the DPP configuration request frame may include identification information for identifying the enrollee AP. In an embodiment of the disclosure, the identification information may be a basic service set identifier (BSSID). In an embodiment of the disclosure, the DPP configuration request frame may include request information for requesting secure information used to connect to the enrollee AP.

In operation 1310, the processor 120 may transmit a DPP configuration response frame corresponding to the DPP configuration request frame to the external electronic device. In an embodiment of the disclosure, the DPP configuration response frame may include second channel information indicating a frequency band in which the electronic device 101 may establish a connection while operating as the enrollee STA. In an embodiment of the disclosure, the second channel information may be generated based on the first channel information acquired from the DPP configuration request frame. In an embodiment of the disclosure, the second channel information may indicate a channel used when the electronic device 101 scans the enrollee AP. In an embodiment of the disclosure, the second channel information may be applied to a channel in which the external electronic device transmits a beacon signal for Wi-Fi scanning while operating the enrollee AP. In an embodiment of the disclosure, when request information for the secure information is included in the DPP configuration request frame, the DPP configuration response frame may include secure information corresponding to the request information. The secure information may include, for example, at least one of a PSK, a passphrase, or a credential.

In operation 1315, in order for the electronic device 101 to connect to the external electronic device operating as the enrollee AP while the electronic device operates as the enrollee STA, the processor 120 may search for a surrounding AP through Wi-Fi scanning. While performing the Wi-Fi scanning, the processor 120 may use at least one of the received BSSID, channel information, or secure information in operation 1305. In an embodiment of the disclosure, the processor 120 may scan only a channel indicated by the channel information instead of performing full scanning of searching for all receivable channels, thereby more promptly finding the enrollee AP while reducing power consumption of the electronic device 101. In an embodiment of the disclosure, the processor 120 may discover the enrollee AP through Wi-Fi scanning, and may determine to directly connect to the enrollee AP indicated by the BSSID. In an embodiment of the disclosure, the processor 120 may access the enrollee AP by using the secure information, thereby skipping a DPP peer discovery procedure (for example, including transmission of a DPP peer discovery request frame and reception of a DPP peer discovery response frame) and a Wi-Fi authentication operation for access to the enrollee AP. When discovering the enrollee AP and performing a peer discovery procedure for the enrollee AP, the processor 120 may proceed to operation 1320.

In operation 1320, the processor 120 may transmit a peer discovery request frame to the external electronic device operating as the enrollee AP. In operation 1325, when a peer discovery response frame responding to the peer discovery request frame is received from the external electronic device, the processor 120 may complete the connection with the external electronic device in operation 1330.

Various embodiment of the disclosure may support the enrollee STA to efficiently perform a procedure of connecting to the electronic device 101 while the electronic device 101 operates as a DPP configurator for configuring the enrollee STA or operates as an enrollee AP.

Figure 14:
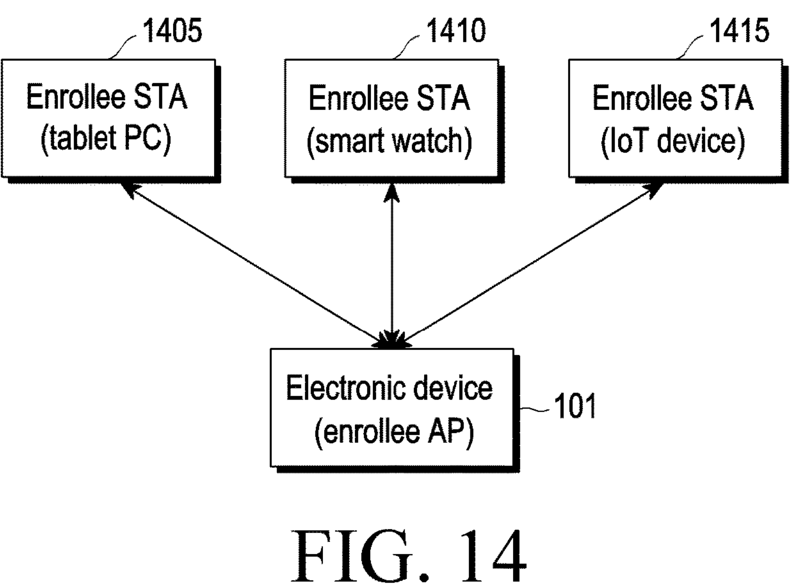
FIG. 14 illustrates a scenario in which an electronic device becomes a Hotspot for tethering service and configures enrollee STAs according to an embodiment of the disclosure.

FIG. 14 illustrates a scenario in which an electronic device becomes a Hotspot for tethering service and configures enrollee STAs according to an embodiment of the disclosure.

Referring to FIG. 14, the electronic device 101 may configure, as enrollee STAs 1405, 1410, and 1415, multiple external electronic devices which needs to be connected to Internet for initial configuration. Each of the enrollee STAs 1405, 1410, and 1415 may be, for example, one of a tablet PC, a smart watch, or an IoT device, and perform Wi-Fi connection only. The electronic device 101 may configure the enrollee STAs 1405, 1410, and 1415 while operating as a DPP configurator, and then become a Hotspot for connecting the enrollee STAs 1405, 1410, and 1415 to Internet while operating as an enrollee AP. Each of the enrollee STAs 1405, 1410, and 1415 may be connected to Internet from the electronic device 101 operating as an enrollee AP, and perform initial configuration.

Figure 15:
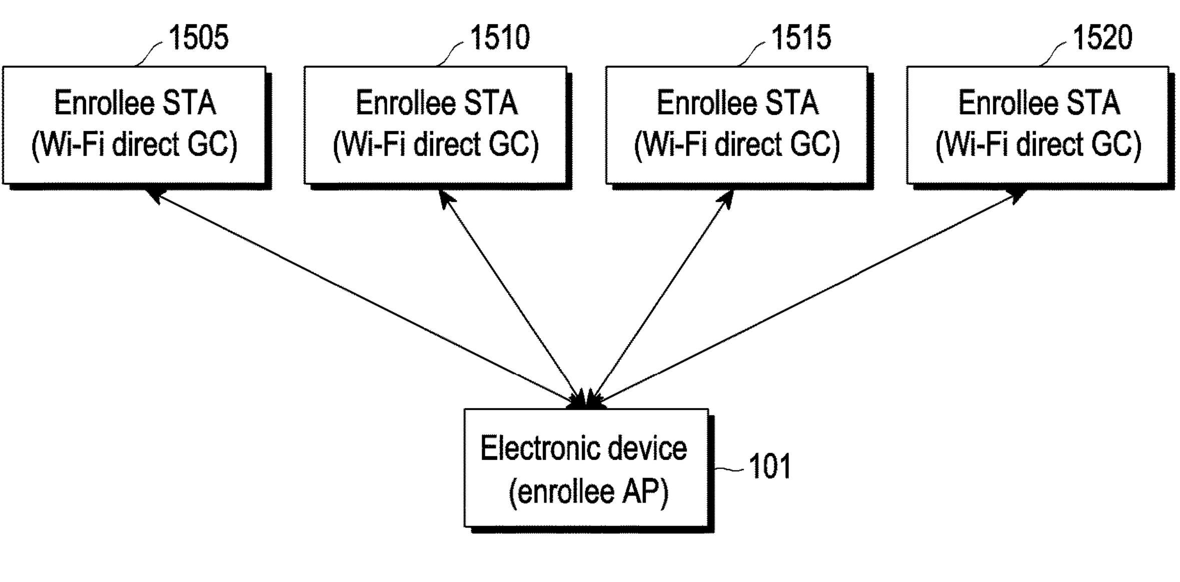
FIG. 15 illustrates a scenario in which an electronic device configures multiple external electronic devices to operate as enrollee STAs according to an embodiment of the disclosure.

FIG. 15 illustrates a scenario in which an electronic device configures multiple external electronic devices, which desires to use a service based on a mutual Wi-Fi direct connection, to operate as enrollee STAs according to an embodiment of the disclosure.

Referring to FIG. 15, each of enrollee STAs 1505, 1510, 1515, and 1520 may be, for example, one of a tablet PC, a smart watch, or an IoT device, and may be configured as a group client (GC) of a Wi-Fi direct group by the electronic device 101. The electronic device 101 may become a group owner (GO) of the Wi-Fi direct group, and the enrollee STAs 1505, 1510, 1515, and 1520 may be mutually connected through the electronic device 101 operating as the enrollee AP. Each of the enrollee STAs 1505, 1510, 1515, and 1520 may access the electronic device 101 operating as the enrollee AP, and may communicate with each other, based on the Wi-Fi direct connection.

Figure 16:
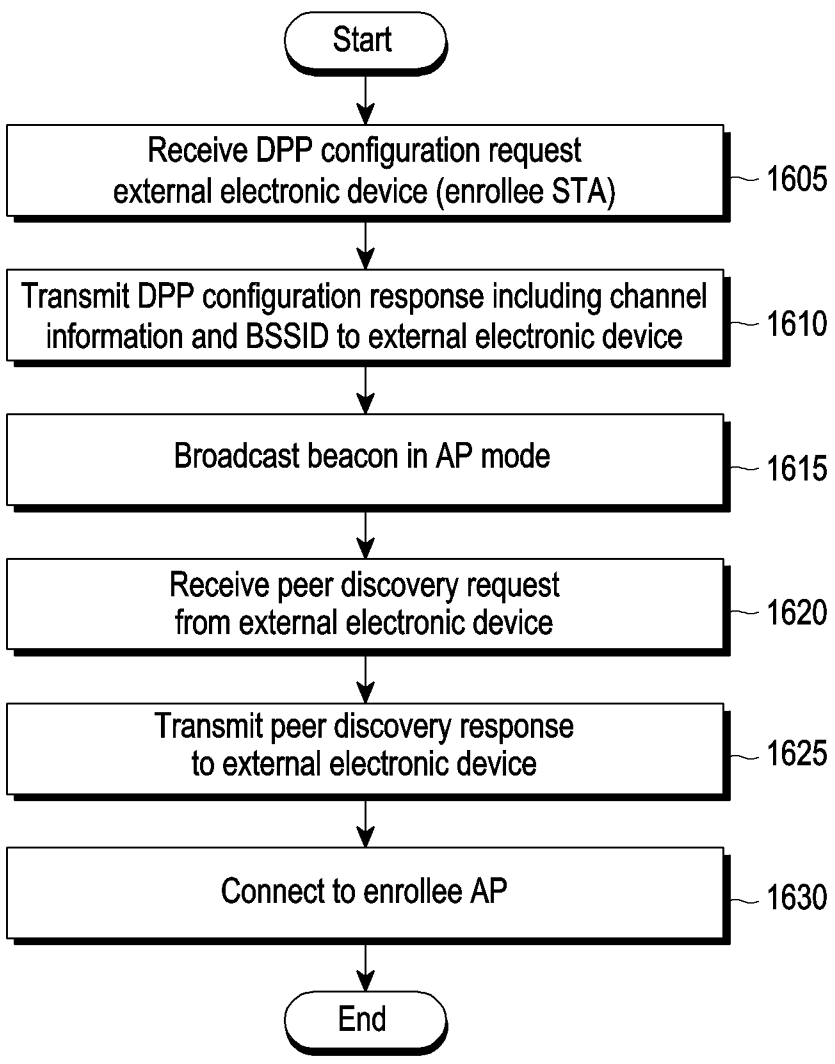
FIG. 16 is a flowchart illustrating a procedure of configuring and connecting an enrollee STA according to an embodiment of the disclosure.

FIG. 16 is a flowchart illustrating a procedure 1600 of configuring and connecting an enrollee STA according to an embodiment of the disclosure.

Referring to FIG. 16, in operation 1605, an electronic device 101 may receive, from an external electronic device (for example, the electronic device 1405, 1410, or 1515 or the external electronic device 1505, 1510, 1515, or 1520), a DPP configuration request frame including first channel information related to a channel in which the external electronic device may operate as an enrollee STA. In an embodiment of the disclosure, the first channel information may include a band support field and/or a band field indicating a frequency band in which an enrollee AP operates. In an embodiment of the disclosure, the DPP configuration request frame may include request information for requesting secure information and identification information related to the enrollee AP. In an embodiment of the disclosure, the identification information may be a BSSID for identifying the enrollee AP.

In operation 1610, the electronic device 101 may transmit a DPP configuration response frame corresponding to the DPP configuration request frame to the external electronic device. In an embodiment of the disclosure, the DPP configuration response frame may include a BSSID and/or second channel information used when the electronic device 101 operates as an enrollee AP. In an embodiment of the disclosure, the second channel information may be generated based on the first channel information acquired from the DPP configuration request frame. In an embodiment of the disclosure, the DPP configuration response frame may include secure information used to access the enrollee AP when the electronic device 101 operates as an enrollee AP. In an embodiment of the disclosure, the BSSID and/or secure information may be included in the DPP configuration response frame when the DPP configuration request frame includes the request information.

In operation 1615, the electronic device 101 may periodically broadcast a beacon signal while operating as an AP mode. In an embodiment of the disclosure, the beacon signal may include the BSSID provided in operation 1610, and may be transmitted through a channel indicated by the channel information provided in operation 1610. When the secure information is included in the DPP configuration response frame, the electronic device 101 may skip a DPP peer discovery procedure and a Wi-Fi authentication operation, and may directly connect to the external electronic device. When the external electronic device discovers the electronic device 101 operating as an enrollee AP and performs with a peer discovery procedure for the enrollee AP, the electronic device 101 may proceed to operation 1620.

In operation 1620, the electronic device 101 may receive a peer discovery request frame from the external electronic device operating as an enrollee STA. When a peer discovery response frame responding to the peer discovery request frame is transmitted to the external electronic device in operation 1625, the electronic device 101 may complete a connection with the enrollee AP in operation 1630.

Referring to FIGS. 17 to 20, 21A to 21C, 22 to 24, 25A, and 25B, an implementation example in which, to operate as an enrollee STA, while operating as a configurator, an electronic device 101 configures an external electronic device to operate as an enrollee AP, and connect to the configured enrollee AP is described.

Figure 17:
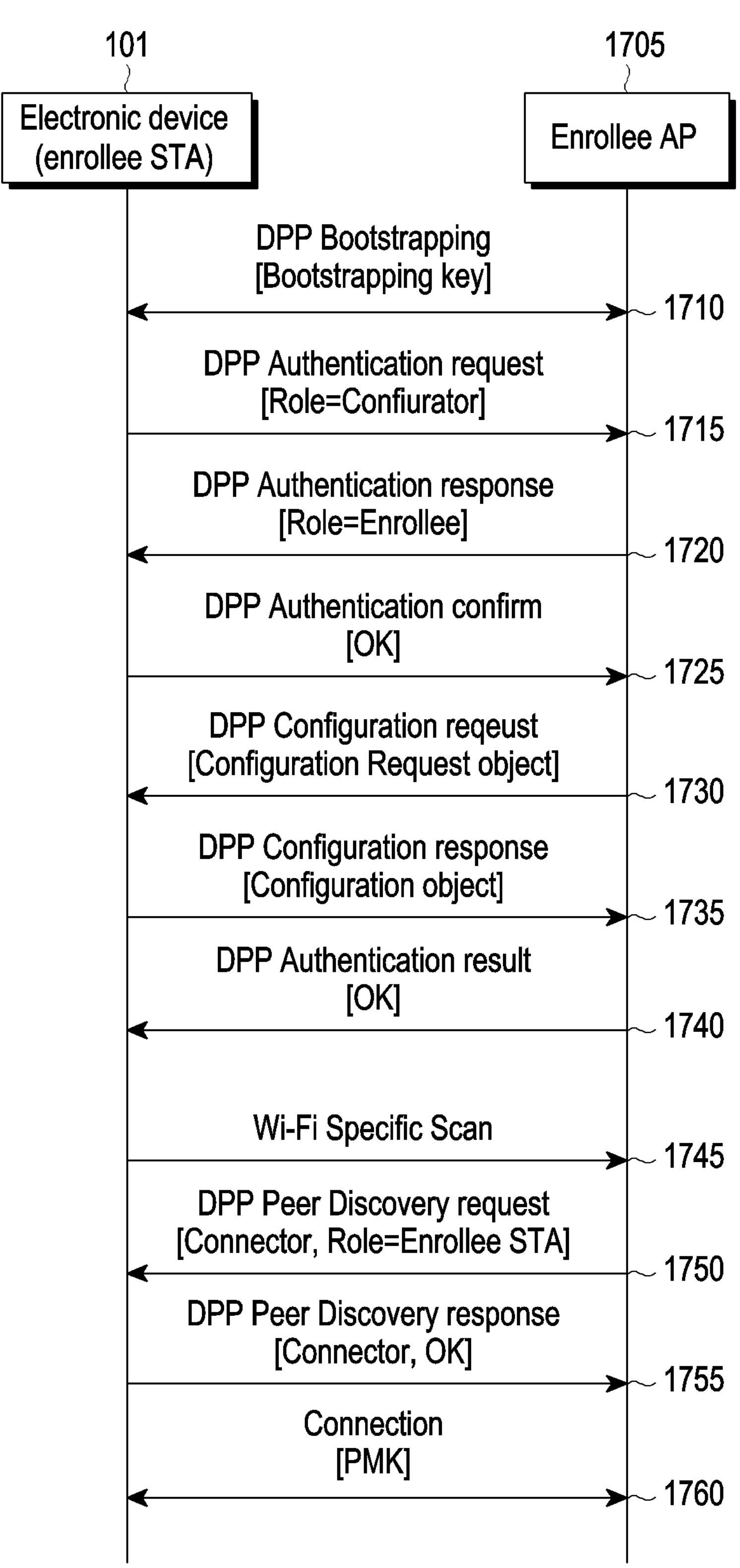
FIG. 17 is a signal flow diagram illustrating a procedure of configuring an enrollee AP and connecting thereto according to an embodiment of the disclosure.

FIG. 17 is a signal flow diagram illustrating a procedure of configuring an enrollee AP and connecting thereto according to an embodiment of the disclosure.

Referring to FIG. 17, an electronic device 101 may generate AP configuration information for configuring an external electronic device (for example, the enrollee AP 1205) as an enrollee AP 1705. In operation 1710, the electronic device 101 may generate a bootstrapping key by performing a DPP bootstrapping operation with the enrollee AP 1705. In operation 1715, the electronic device 101 may transmit a DPP authentication request frame to the enrollee AP 1705 by using the generated bootstrapping key. The DPP authentication request frame may include network role information indicating that a network role of the electronic device 101 is a configurator. For example, the format of the DPP authentication request frame may be configured as shown in FIG. 18. A detailed description of FIG. 18 will be made below. In operation 1720, the enrollee AP 1705 may transmit a DPP authentication response frame corresponding to the DPP authentication request frame to the electronic device 101. The DPP authentication response frame may include network role information indicating that a network role of the enrollee AP 1705 is an enrollee. For example, the format of the DPP authentication response frame may be configured as shown in FIG. 19. A detailed description of FIG. 19 will be made below. In operation 1725, the electronic device 101 may notify to the enrollee AP 1705 that the electronic device 101 has successfully performed DPP authentication, through the DPP authentication confirm frame. Through the DPP authentication operation in operations 1715, 1720, and 1725, the electronic device 101 may operate as a configurator, and the enrollee AP 1705 may operate as an enrollee.

In operation 1730, the enrollee AP 1705 may transmit a DPP configuration request frame to the electronic device 101. In an embodiment of the disclosure, the DPP configuration request frame may include at least one of a BSSID for identifying the enrollee AP 1705, channel information of the enrollee AP 1705, or request information for requesting secure information. For example, the DPP configuration request frame may be configured as shown in FIG. 20. A detailed description of FIG. 20 will be made below. In operation 1735, the electronic device 101 may transmit a DPP configuration response frame to the DPP configuration request frame to the enrollee AP 1705. In an embodiment of the disclosure, the DPP configuration response frame may include connector information related to a connection to the electronic device 101. In an embodiment of the disclosure, the DPP configuration response frame may include secure information and/or channel information that the electronic device 101 desires to use for connection to the enrollee AP 1705. In an embodiment of the disclosure, the secure information may be included in the DPP configuration response frame in response to request information in the DPP configuration request frame.

In operation 1740, the enrollee AP 1705 may transmit a DPP configuration result frame to the electronic device 101 to notify that a DPP configuration has been successfully completed. Although not shown, when determining that an AP mode operation according to the channel information and/or secure information in the DPP configuration response frame is impossible, the enrollee AP 1705 may include, in the DPP configuration result frame, information notifying of a DPP configuration failure, and transmit the same to the electronic device 101, and the electronic device 101 may end or restart the DPP configuration operation in response to the DPP configuration failure.

In operations 1730, 1735, and 1740, when the DPP configuration is successfully completed, the enrollee AP 1705 may operate in an AP mode, based on the channel information and/or secure information acquired through the DPP configuration. In the AP mode, the enrollee AP 1705 may periodically broadcast a beacon signal including the BSSID transmitted in operation 1730, through a channel indicated by the channel information acquired in operation 1735. While the enrollee AP 1705 is successfully configured and operates, the electronic device 101 may search for the enrollee AP 1705 by performing Wi-Fi scanning for connection to the enrollee AP 1705, and acquire connection information of the enrollee AP 1705, in operation 1745. In an embodiment of the disclosure, when the channel information is included in the DPP configuration response frame, the electronic device 101 may perform Wi-Fi scanning on at least one channel indicated by the channel information. In an embodiment of the disclosure, when a BSSID is included in the DPP configuration request frame, the electronic device 101 may attempt to connect to the enrollee AP 1705 identified by the BSSID, among APs discovered through Wi-Fi scanning. In an embodiment of the disclosure, when the secure information is included in the DPP configuration response frame, after discovering the enrollee AP 1705, the electronic device 101 may skip a peer discovery procedure and a Wi-Fi authentication procedure while accessing the enrollee AP 1705 by using connection information acquired through the Wi-Fi scanning, and may proceed to operation 1760 to establish a connection with the enrollee AP 1705.

Once discovering the enrollee AP 1705 through the Wi-Fi scanning and acquiring connection information required to connect to the enrollee AP 1705, the electronic device 101 may transmit a peer discovery request frame to the enrollee AP 1705 in operation 1750. In an embodiment of the disclosure, the electronic device 101 may determine to transmit the peer discovery request frame when the electronic device 101 does not have secure information of the enrollee AP 1705. In an embodiment of the disclosure, the peer discovery request frame may include connector information related to the electronic device 101. In an embodiment of the disclosure, the peer discovery request frame may include network role information indicating that the electronic device 101 operates as an enrollee STA. For example, the peer discovery request frame may be configured as shown in FIG. 22. A detailed of FIG. 22 will be made below. In operation 1755, the enrollee AP 1705 may identify that the electronic device 101 is a configurator which has configured the enrollee AP 1705 and the enrollee AP 1705 has a public key related to the electronic device 101, through connector information included in the peer discovery request frame, and may transmit a peer discovery response frame to the peer discovery request frame. The peer discovery response frame may include connector information related to the enrollee AP 1705 and information notifying that the peer discovery procedure has been successfully completed. For example, the peer discovery response frame may be configured as shown in FIG. 23. A detailed description of FIG. 23 will be made below.

In operation 1760, the electronic device 101 may establish a connection to the enrollee AP 1705 by accessing the enrollee AP 1705. In an embodiment of the disclosure, when the electronic device 101 fails to acquire secure information of the enrollee AP 1705 from the DPP configuration response frame of operation 1735, the electronic device 101 may perform an operation of acquiring the secure of the enrollee AP 1705, for example, PMK, in operation 1760. In an embodiment of the disclosure, when the electronic device 101 acquires secure information of the enrollee AP 1705 from the DPP configuration response frame in operation 1735, the electronic device 101 may skip a procedure of acquiring secure information of the enrollee AP 1705, for example, PMK, and connect to the enrollee AP 1705 by using the acquired secure information.

FIG. 18 illustrates a format of a DPP authentication request frame according to an embodiment of the disclosure.

Referring to FIG. 18, a DPP authentication request frame 1800 may include at least one of a responder bootstrapping key hash, an initiator bootstrapping key hash, an initiator protocol key, a protocol version, a channel attribute, an initiator nonce attribute, or an initiator capability attribute 1805. In an embodiment of the disclosure, the initiator capability attribute 1805 may include network role information of the electronic device 101, which corresponds to an initiator for transmitting the DPP authentication response frame 1800. In an embodiment of the disclosure, the initiator capability attribute 1805 may include one of a value indicating that the electronic device 101 is dedicated to a configurator, a value indicating that the electronic device is dedicated to an enrollee, and a value indicating that the electronic device is both an enrollee and a configurator, and in an embodiment of the disclosure, the initiator capability attribute 1805 may be configured as a value indicating that the electronic device is dedicated to a configurator.

FIG. 19 illustrates a format of a DPP authentication response frame according to an embodiment of the disclosure.

Referring to FIG. 19, a DPP authentication response frame 1900 may include at least one of a DPP status field, a responder bootstrapping key hash, an initiator bootstrapping key hash, a responder protocol key, a protocol version, or primary wrapped data. In an embodiment of the disclosure, the primary wrapped data may include at least one of a responder nonce attribute, an initiator nonce attribute, or a responder capability attribute 1905. In an embodiment of the disclosure, the responder capability attribute 1905 may include network role information of the enrollee AP 1705 corresponding to a responder for transmitting the DPP authentication response frame 1800. In an embodiment of the disclosure, the responder capability attribute 1905 may include at least one of a value indicating that the enrollee AP 1705 is dedicated to a configurator, a value indicating that the enrollee AP is dedicated to an enrollee, and a value indicating that the electronic device is an enrollee and a configurator, and in an embodiment of the disclosure, the responder capability attribute 1905 may be configured as a value indicating that the enrollee AP is dedicated to a configurator.

Table 3 shows a bit configuration of an enrollee and a configurator, which can be included in the initiator capability attribute or the responder capability attribute.

TABLE 3

| Enrollee (B0) | Configurator (B1) | Description |
|---|---|---|
| 0 | 0 | Not allowed |
| 0 | 1 | Device is Configurator only |
| 1 | 0 | Device is Enrollee only |
| 1 | 1 | Device is an Enrollee and Configurator (only applicable for Initiator Capabilities attribute) |

FIG. 20 illustrates a format of a DPP configuration request frame according to an embodiment of the disclosure.

Referring to FIG. 20, a DPP configuration request frame 2000 may include a DPP configuration request object, and the DPP configuration request object may include at least one of a device name, a Wi-Fi technology field, a network role field, a manufacturer usage description (MUD) universal resource locator (URL), a band support field 2005, a band field 2010, or a certificate request field. The Wi-Fi technology field may include a value for identifying a Wi-Fi technology of a policy provisioned within the enrollee AP 1705. A network role field may include a value indicating a network role that the enrollee AP 1705 is to operate. For example, the network role field may indicate an STA or an AP. In an embodiment of the disclosure, channel information indicating a frequency band in which the enrollee AP 1705 may operate may include at least one of the support band field 2005 or the band field 2010. In an embodiment of the disclosure, the support band field 2005 may include a list of band parameters supported by the enrollee AP 1705. In an embodiment of the disclosure, the band field 2010 may be configured as an integer value indicating a frequency band in which the enrollee AP 1705 operates. The electronic device 101 may refer to at least one of the support band field 2005 or the band field 2010 in performing Wi-Fi scanning for searching for the enrollee AP 1705.

In an embodiment of the disclosure, the DPP configuration request frame 2000 may include request information 2015 referred to as an "access security request" to request secure information of the electronic device 101. For example, the request information 2015 may include a string for requesting a PSK, a passphrase, and/or a credential corresponding to secure information for accessing the enrollee AP 1705.

In an embodiment of the disclosure, the DPP configuration request frame 200 may include a BSSID of the enrollee AP 1705, which can be used when the electronic device 101 searches for the enrollee AP 1705. The electronic device 101 may identify the enrollee AP 1705 during Wi-Fi scanning, based on the BSSID.

FIGS. 21A, 21B, and 21C illustrate a format of a DPP configuration response frame according to various embodiments of the disclosure.

Referring to FIGS. 21A, 21B, and 21C, a DPP configuration response frame 2100 may include a DPP configuration object, a discovery object, and a credential object. The DPP configuration object may include at least one of a Wi-Fi technology object or a service field. The discovery object may include at least one of at least one SSID or an SSID character set. The credential object may include at least one of an authentication and key management type field, a PSK field 2105*a* referred to as a "preshared key", a passphrase field 2105*b* referred to as a "WPA2 passphrase and/or SAE password", or a C sign key. Secure information used when the electronic device 101 discovers the enrollee AP 1705 and then connects to the enrollee AP 1705 may include the PSK field 2105*a* and/or the passphrase field 2105*b*. In an embodiment of the disclosure, the secure information may further include an enterprise credential object 2105*c*. In an embodiment of the disclosure, at least one of the PSK field 2105*a*, the passphrase field 2105*b*, or the enterprise credential object 2105*c*, which can be included in the secure information, may be included in the DPP configuration response frame 2100 by the electronic device 101, in response to the request information 2015 in the DPP configuration request frame 2000.

In an embodiment of the disclosure, the DPP configuration response frame 2100 may include at least one of a support band field 2110 or a band field 2115, as channel information indicating a channel in which the enrollee AP 1705 operates. The electronic device 101 may include, in the DPP configuration response frame 2100, channel information 2110 or 2115 indicating a frequency band in which the electronic device 101 operates as an enrollee STA, and the enrollee AP 1705 may transmit a beacon signal for Wi-Fi scanning on a channel indicated by the channel information when acquiring the channel information 2110 or 2115. In an embodiment of the disclosure, the channel information 2110 or 2115 included in the DPP configuration response frame 2100 may be generated by the electronic device 101, based on the channel information 2005 or 2010 acquired from the DPP configuration request frame 2000.

FIG. 22 illustrates a format of a peer discovery request frame according to an embodiment of the disclosure.

Referring to FIG. 22, a peer discovery request frame 2200 may include at least one of a transaction ID or a protocol version, and may further include connector information 2205. The transaction ID is a unique octet value for identifying a current request, the connector information 2205 may be used for security communication between the electronic device 101 and the enrollee AP 1705, and the protocol version may be included when the electronic device 101 supports two or more protocols. In an embodiment of the disclosure, the connector information 2205 may include information indicating that a network role of the electronic device 101 for transmitting the peer discovery request frame 2200 is an enrollee STA.

FIG. 23 illustrates a format of a peer discovery response frame according to an embodiment of the disclosure.

Referring to FIG. 23, a peer discovery response frame 2300 may include at least one of a transaction ID, a DPP status field, or a protocol version, and may further include connector information 2305. The connector information 2305 may include information indicating that a network role of the enrollee AP 1705 for transmitting the peer discovery response frame is an enrollee AP.

FIG. 24 illustrates a format of a DPP connector body object included in connector information according to an embodiment of the disclosure.

Referring to FIG. 24, the connector 2205 or 2305 may include a DPP connector body object 2400. The DPP connector body object 2400 may include a group object in a JSON web signature (JWS) payload, wherein each group object may be identified by a group ID, and may include a netRole field 2405 indicating whether a network role allocated to an owner of the connector information 2205 or 2305 is an STA, AP, or a configurator. In an embodiment of the disclosure, the netRole field 2405 included in the connector information 2205 in the peer discovery request frame 2200 may be indicate that a network role of the electronic device 101 is an STA. In an embodiment of the disclosure, the netRole field 2405 included in the connector information 2305 in the peer discovery response frame 2300 may indicate that a network role of the enrollee AP 1705 is an AP.

Figure 25A:
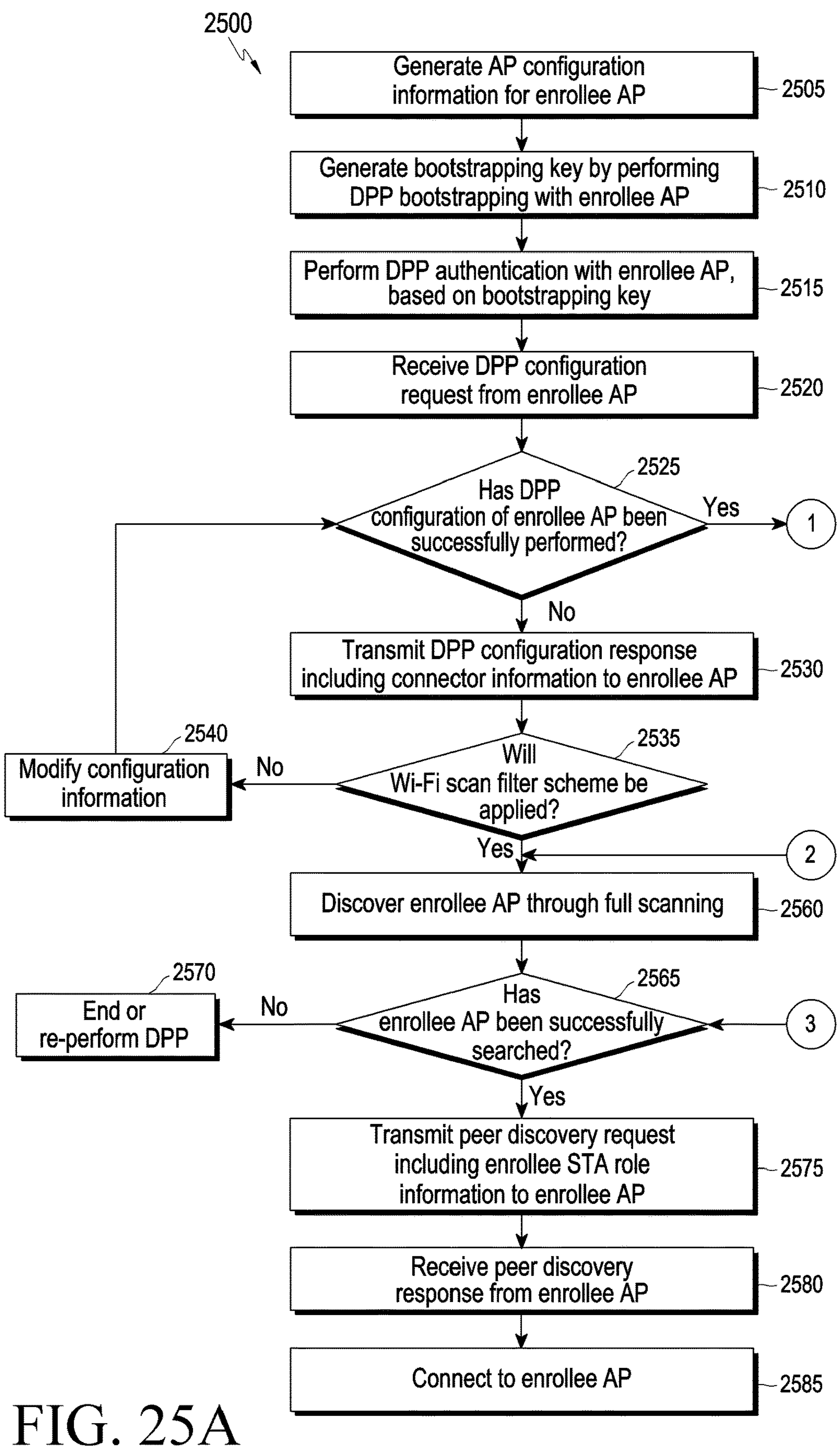
FIGS. 25A and 25B are flowcharts illustrating a procedure in which an electronic device configures an enrollee AP and connects thereto according to various embodiments of the disclosure.
Figure 25B:
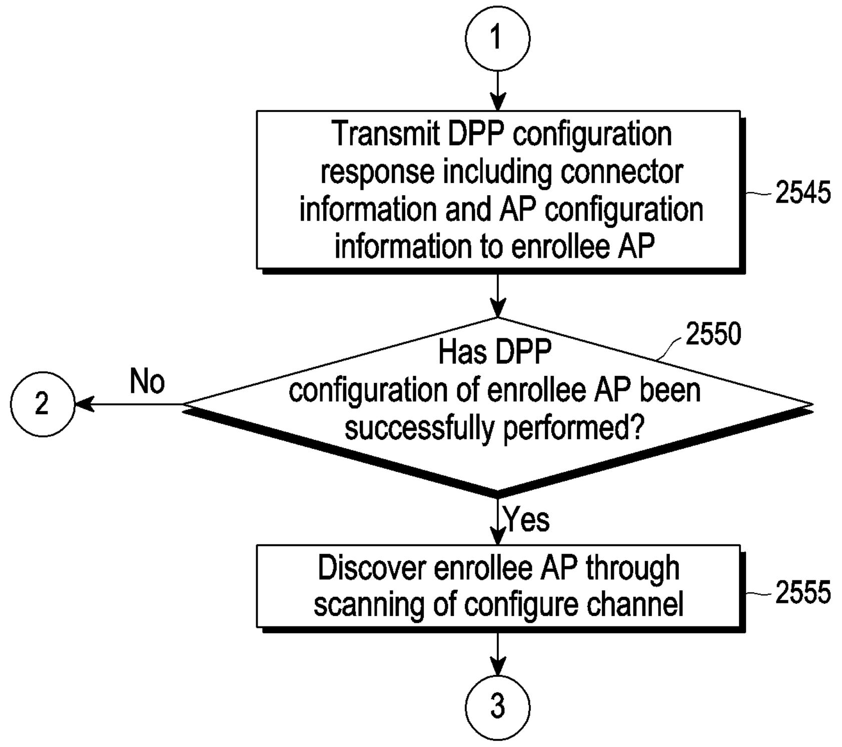

FIGS. 25A and 25B are flowcharts illustrating a procedure 2500 in which an electronic device configures an enrollee AP and connects thereto according to various embodiments of the disclosure. At least some of the illustrated operations may be performed by at least one processor (for example, the processor 120) and a communication module (for example, the communication module 190) include in the electronic device 101.

Referring to FIGS. 25A and 25B, in operation 2505, the processor 120 may generate AP configuration information for configuring an external electronic device (for example, the enrollee AP 1205) as an enrollee AP (for example, the enrollee AP 1705). In operation 2510, the processor 120 may generate a bootstrapping key by performing DPP bootstrapping with the enrollee AP 1705. In an embodiment of the disclosure, operation 2510 may include at least one of operation 711, operation 713, operation 715, or operation 717 of FIG. 7. In operation 2515, the processor 120 may perform DPP authentication with the enrollee AP 1705, based on the bootstrapping key. In an embodiment of the disclosure, operation 2515 may include at least one of operation 721, operation 723, operation 725, operation 727, operation 729, or operation 731 of FIG. 7.

In operation 2520, the processor 120 may receive a DPP configuration request frame from the enrollee AP 1705. In an embodiment of the disclosure, the DPP configuration request frame may include at least one of a BSSID 2020, channel information 2005 or 2010, or secure information 2015, as illustrated in FIG. 20. In operation 2525, the processor 120 may determine whether to include, in a DPP configuration response frame to be transmitted to the enrollee AP 1705, AP configuration information generated in operation 2505, in response to the DPP configuration request frame. For example, the processor 120 may determine to include the AP configuration information when accessing the enrollee AP 1705 while operating as the enrollee STA after the configuration of the enrollee AP 1705 is completed.

If it is not determined to include the AP configuration information, the operation 120 may transmit a DPP configuration response frame including connector information to the enrollee AP 1705 without AP connection information in operation 2530. In operation 2535, the processor 120 may determine whether the DPP configuration of the enrollee AP 1705 has been successfully performed, based on a DPP configuration result frame received from the enrollee AP. When the DPP configuration of the enrollee AP 1705 has failed to be successfully performed, the processor 120 may amend configuration values included in the AP configuration information in operation 2540, and may return in operation 2525. When the DPP configuration of the enrollee AP 1705 has been successfully performed in operation 2535, the processor 120 may search for surrounding APs through Wi-Fi fill scanning in operation 2560. The processor 120 may determine whether the enrollee AP 1705 has been successfully discovered and found in operation 2565, and may proceed to operation 2575 when the enrollee AP 1705 has been successfully found. When the enrollee AP 1705 has failed to be successfully found, the processor 120 may determine to end or re-perform the DPP configuration in operation 2570.

When determining to include the AP configuration information in a DPP configuration response frame in operation 2525, the processor 120 may transmit a DPP configuration response frame including the AP configuration information and connector information to the enrollee AP in operation 2545. The processor 120 may determine whether the DPP configuration of the enrollee AP 1705 has been successfully performed, based on a DPP configuration result frame received from the enrollee AP in operation 2550. When the configuration of the AP 1705 has failed to be successfully performed, the processor may proceed to operation 2540. When the configuration of the enrollee AP 1705 has been successfully performed, the processor 120 may perform Wi-Fi scanning on a channel indicated by channel information included in the AP configuration information and discover the enrollee AP 1705 in operation 2555, and may proceed to operation 2565. The processor 120 may determine that the enrollee AP 1705 has been successfully discovered and found in operation 2565, and may proceed to operation 2575 when the enrollee AP 1705 has been successfully found.

In operation 2575, the processor 120 may transmit, to the enrollee AP 1705, a DPP peer discovery request frame including network role information indicating that the electronic device 101 takes a network role of an enrollee STA. The processor 120 may receive a peer discovery response frame from the enrollee AP 1705 in operation 2580, and may connect to the enrollee AP 1705 in operation 2585. In an embodiment of the disclosure, when the DPP configuration response frame transmitted in operation 2530 or operation 2545 does not include secure information to be used by the enrollee AP 1705, the processor 120 may perform, in operation 2585, a procedure of acquiring secure information including PMK to connect to the enrollee AP 1705.

Referring to FIGS. 26, 27, 28A to 28C, 29A, and 29B below, embodiments in which the electronic device 101 configures an external electronic device to operate as an enrollee STA while operating as a DPP configurator to operate as an enrollee AP, and support the configured enrollee STA to be connected to the electronic device 101.

Figure 26:
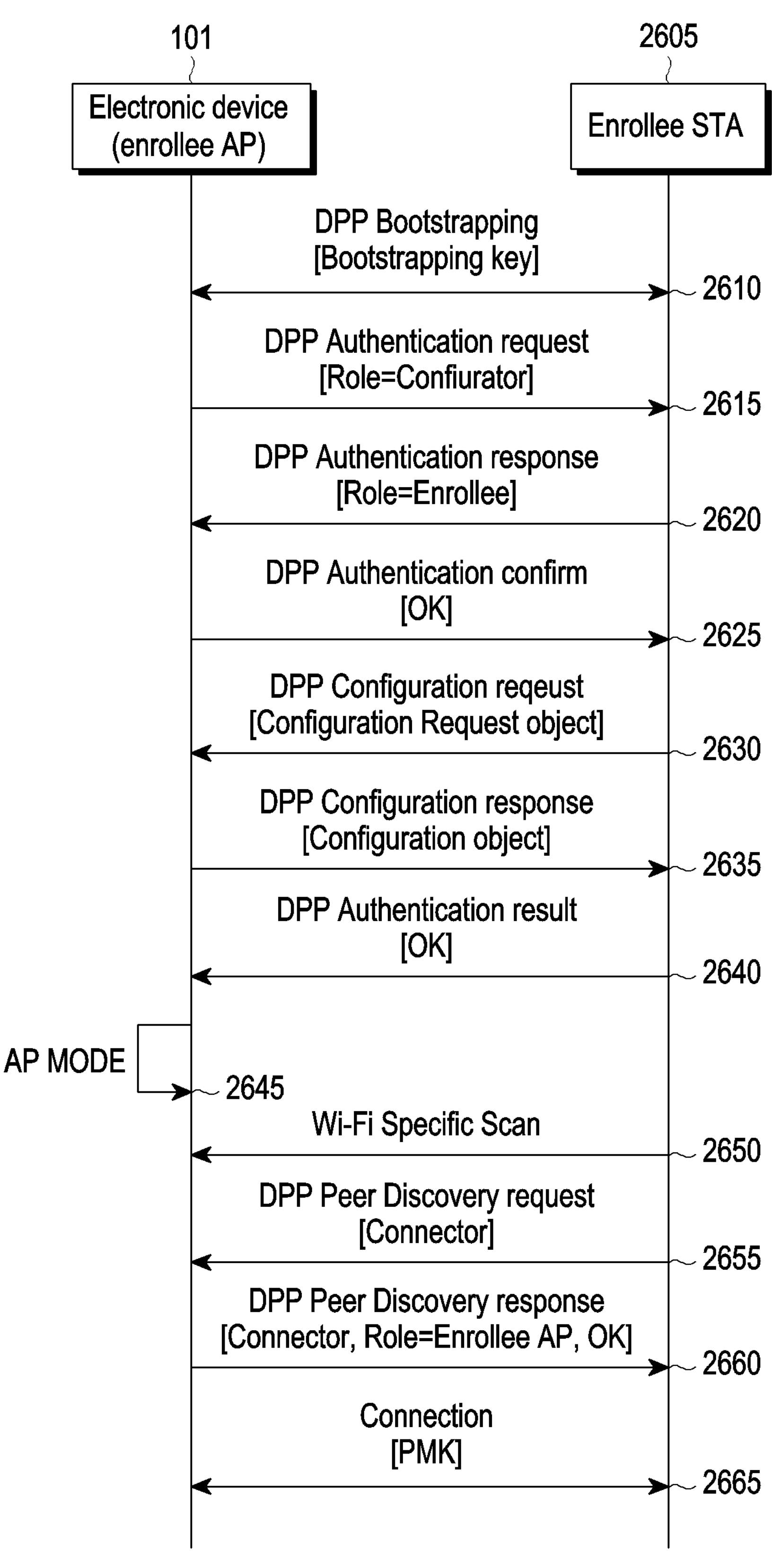
FIG. 26 is a signal flow diagram illustrating a procedure of configuring an enrollee STA and connecting thereto according to an embodiment of the disclosure.

FIG. 26 is a signal flow diagram illustrating a procedure of configuring an enrollee STA and connecting thereto according to an embodiment of the disclosure.

Referring to FIG. 26, to connect an electronic device 101 to an external electronic device (for example, an external electronic device 1405, 1410, 1415, 1505, 1510, 1515, or 1520), the electronic device may determine to configure the external electronic device as an enrollee STA 2605. In operation 2610, the electronic device 101 may generate a bootstrapping key by performing a DPP bootstrapping operation with the enrollee STA 2605. In operation 2615, the electronic device 101 may transmit a DPP authentication request frame to the enrollee STA 2605 by using the generated bootstrapping key in order to perform DPP authentication with the enrollee STA 2605. In an embodiment of the disclosure, the DPP authentication request frame may include network role information indicating that a network role of the electronic device 101 is a configurator. For example, the format of the DPP authentication request frame may be configured as shown in FIG. 18. In operation 2620, the enrollee STA 2605 may transmit the DPP authentication response frame corresponding to the DPP authentication request frame to the electronic device 101. The DPP authentication response frame may include network role information indicating that a network role of the enrollee STA 2605 is an enrollee. For example, the format of the DPP authentication response frame may be configured as shown in FIG. 19. In operation 2625, the electronic device 101 may transmit a DPP authentication confirm frame to notify to the enrollee STA 2605 that DPP authentication has been successfully performed. Through the DPP authentication in operations 2615, 2620, and 2625, the electronic device may operate as a configurator, and the enrollee STA 2605 may operate as an enrollee.

In operation 2630, the enrollee STA 2605 may transmit a DPP configuration request frame to the electronic device 101. In an embodiment of the disclosure, the DPP configuration request frame may include channel information to be used by the enrollee STA 2605. In an embodiment of the disclosure, the DPP configuration request frame may include request information indicating that the enrollee STA 2605 requests a BSSID and secure information from the electronic device 101. For example, the DPP configuration request frame may be configured as shown in FIG. 27. A detailed description of FIG. 27 will be made below.

In operation 2635, the electronic device 101 may transmit a DPP configuration response frame corresponding to the DPP configuration request frame to the enrollee STA 2605. In an embodiment of the disclosure, the DPP configuration response frame may include connector information related to a connection to the electronic device 101. In an embodiment of the disclosure, the DPP configuration response frame may include at least one of a BSSID, channel information, or secure information which can be used for connection to the electronic device 101 by the enrollee STA 2605. In an embodiment of the disclosure, channel information included in the DPP configuration response frame may be generated based on channel information included in the DPP configuration request frame. In an embodiment of the disclosure, the BSSID and secure information may be included in the DPP configuration response frame in response to the request information in the DPP configuration request frame. For example, the DPP configuration response frame may be configured as shown in FIGS. 28A, 28B, and 28C. A detailed description of FIGS. 28A, 28B, and 28C will be made below.

In operation 2640, the enrollee 2605 may transmit, to the electronic device 101, a DPP configuration result frame notifying that DPP configuration has been successfully completed. Although not shown, when determining that an operation according to the channel information and/or secure information in the DPP configuration response frame is not possible, the enrollee STA 2605 may include, in the DPP configuration result frame, information notifying of a DPP configuration failure, and transmit the same to the electronic device 101, and the electronic device 101 may end or restart the DPP configuration operation in response to the DPP configuration failure.

In operation 2645, the electronic device 101 may periodically broadcast a beacon signal, based on the channel information and BSSID provided to the enrollee STA 2605 through the DPP configuration response frame, while operating as an enrollee AP (or GO or Hotspot). When the DPP configuration of the enrollee STA 2605 has been successfully performed in operations 2630, 2635, and 2640, the enrollee STA 2605 may search for the electronic device 101 operating as an enrollee AP by performing Wi-Fi scanning based on the BSSID and channel information acquired through the DPP configuration response frame, and acquire connection information of the electronic device 101, in operation 2650. In an embodiment of the disclosure, the enrollee STA 2605 may perform Wi-Fi scanning on all receivable channels and acquire connection information used for a connection with the electronic device 101 operating in the enrollee AP. In an embodiment of the disclosure, the enrollee STA 2605 may perform Wi-Fi scanning on a channel indicated by the channel information, thereby more promptly finding the electronic device 101. In an embodiment of the disclosure, the enrollee STA 2605 may search for one or more surrounding APs found discovered through Wi-Fi scanning, select the enrollee AP having the BSSID from among the found surrounding APs, and determine to connect to the selected enrollee AP.

In operation 2655, the enrollee STA 2605 may transmit a peer discovery request frame including connector information to the electronic device 101. For example, the peer discovery request frame may be configured as shown in FIG. 22. In operation 2660, the electronic device 101 may identify that a public key known by the enrollee STA 2605 is identical to a public key of the electronic device 101, through connector information included in the peer discovery request frame, and may transmit a peer discovery response frame including network role information indicating that a network role of the electronic device 101 is an enrollee AP, to the enrollee STA 2605. For example, the peer discovery response frame may be configured as shown in FIG. 23.

In operation 2665, the enrollee STA 2605 may establish a connection with the electronic device 101 by accessing the electronic device 101. In an embodiment of the disclosure, when the enrollee STA 2605 has failed to acquire secure information of the electronic device 101 from the DPP configuration response frame in operation 2635, the enrollee STA 2605 may perform an operation for acquiring secure information of the electronic device 101, for example, PMK, in operation 2665. In an embodiment of the disclosure, when the enrollee STA 2605 acquires secure information of the electronic device 101 from the DPP configuration response frame of operation 2635, the enrollee STA 2605 may skip a procedure of acquire the secure information of the electronic device 101, for example, PMK, and connect to the electronic device 101 by using the acquired secure information.

FIG. 27 illustrates a format of a DPP configuration request frame according to an embodiment of the disclosure.

Referring to FIG. 27, a DPP configuration request frame 2700 may include a DPP configuration request object, and the DPP configuration request frame may include at least one of a device name, a Wi-Fi technology field, a network role field, a URL of MUD, a support band field 2705, a band field 2710, or a certificate request field. In an embodiment of the disclosure, channel information indicating a frequency band which can be operated by the enrollee STA 2605 may include at least one of the support band field 2705 or the band field 2710. For example, the support band field 2705 may include a list of band parameters supported by the enrollee STA 2605. For example, the band field 2710 may be configured as an integer value indicating a frequency band in which the enrollee STA 2605 operates. The electronic device 101 may refer to at least one of the support band field 2705 or the band field 2710 in determining channels used when operating as an enrollee AP.

In an embodiment of the disclosure, the DPP configuration request frame 2700 may include request information 2715 referred to as an "access security request" to request a BSSID and/or secure information of the electronic device 101. For example, the request information 2715 may include a string for requesting a BSSID for identifying the enrollee AP 1705, and/or a string for requesting a PSK, a passphrase, and/or a credential corresponding to secure information for accessing the enrollee AP 1705.

FIGS. 28A, 28B, and 28C illustrate a format of a DPP configuration response frame according to various embodiments of the disclosure.

Referring to FIGS. 28A, 28B, and 28C, a DPP configuration response frame 2800 may include a DPP configuration object, a discovery object, and a credential object. The DPP configuration object may include at least one of a Wi-Fi technology object or a service field. The discovery object may include a BSSID 2805 used when an electronic device 101 operates as an enrollee AP, and may further include at least one of at least one SSID or a SSID character set. The credential object may include at least one of an authentication and key management type field, a PSK field 2810*a*, a passphrase field 2810*b*, or a C sign key. Secure information used when the enrollee STA 2605 discovers the electronic device 101 and then connects to the electronic device 101 may include the PSK field 2810*a* and/or the passphrase field 2810*b*. In an embodiment of the disclosure, the secure information may further include an enterprise credential object 2810*c*. In an embodiment of the disclosure, the BSSID 2805 and at least one of the PSK field 2810*a*, the passphrase field 2810*b*, or the enterprise credential object 2810*c*, which can be included in the secure information, may be included in the DPP configuration response frame 2100 by the electronic device 101, in response to the request information 2715 in the DPP configuration request frame 2700.

In an embodiment of the disclosure, the DPP configuration response frame 2800 may include at least one of a support band field 2815 or a band field 2820, as channel information indicating a channel used when the electronic device 101 operates as an enrollee AP. The electronic device 101 may include, in the DPP configuration response frame 2800, channel information 2815 or 2820 indicating a frequency band in which the electronic device 101 operates as an enrollee AP, and when acquiring the channel information 2815 or 2820, the enrollee AP 2605 may perform Wi-Fi scanning on a channel indicated by the channel information. In an embodiment of the disclosure, the channel information 2815 or 2820 included in the DPP configuration response frame 2800 may be generated by the electronic device 101, based on the channel information 2705 or 2710 acquired from the DPP configuration request frame 2700.

Figure 29A:
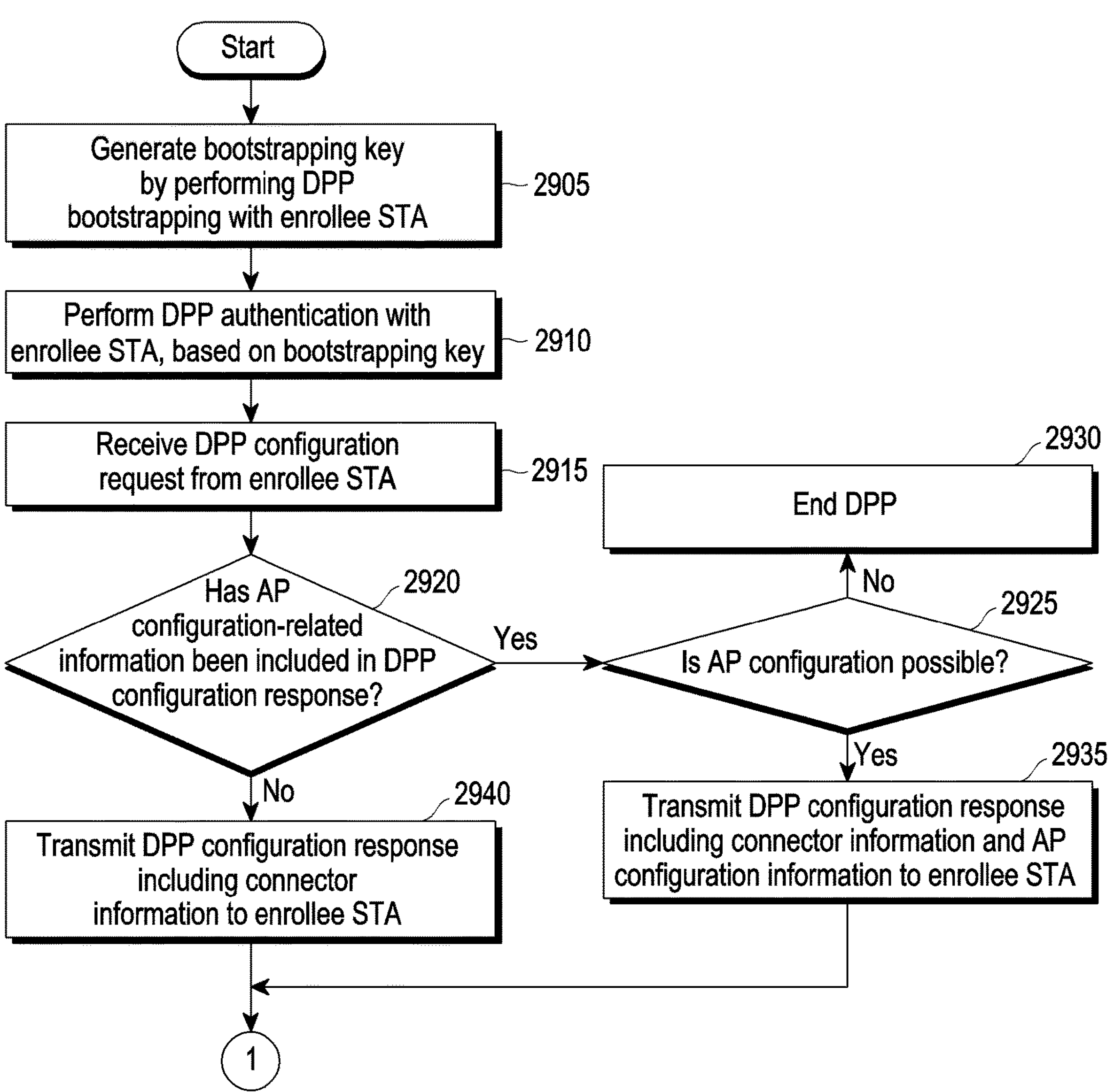
FIGS. 29A and 29B are flowcharts illustrating a procedure in which an electronic device configures an enrollee STA and connects thereto according to various embodiments of the disclosure.
Figure 29B:
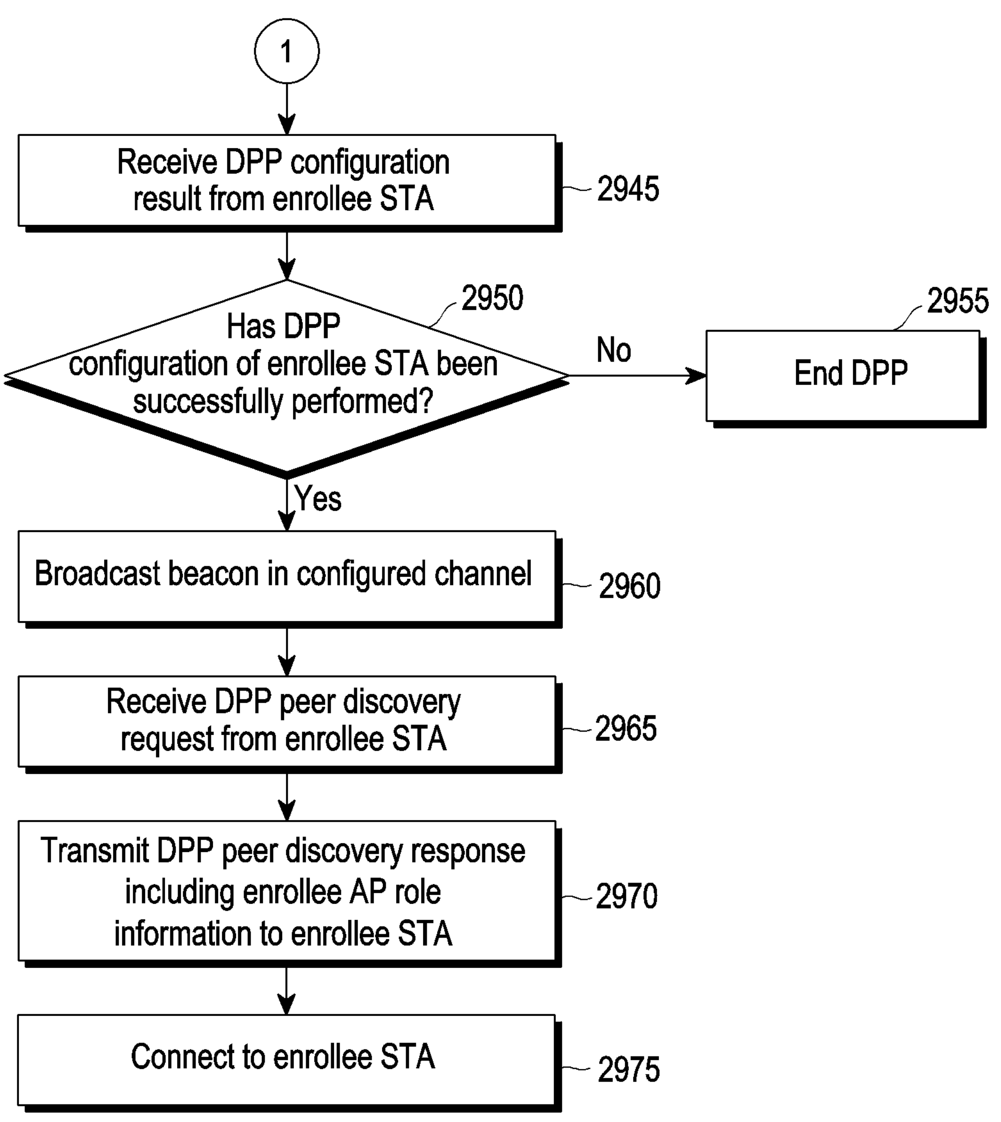

FIGS. 29A and 29B are flowcharts illustrating a procedure 2900 in which an electronic device configures an enrollee STA and connects thereto according to various embodiments of the disclosure. At least some of the illustrated operations may be performed by at least one processor (for example, the processor 120) and a communication module (for example, the communication module 190) included in the electronic device 101.

Referring to FIGS. 29A and 29B, in operation 2905, the processor 120 may generate a bootstrapping key by performing DPP bootstrapping with an enrollee STA 2605 to configure an external electronic device (for example, an external electronic device 1405, 1410, 1415, 1505, 1510, or 1520) as an enrollee STA (for example, the enrollee STA 2605). In an embodiment of the disclosure, operation 2905 may include at least one of operation 711, operation 713, operation 715, or operation 717 of FIG. 7. In operation 2910, the processor 120 may perform DPP authentication with the enrollee STA 2605, based on the bootstrapping key. In an embodiment of the disclosure, operation 2910 may include at least one of operation 721, operation 723, operation 725, operation 727, operation 729, or operation 731 of FIG. 7.

In operation 2915, the processor 120 may receive a DPP configuration request frame from the enrollee STA 2605. In an embodiment of the disclosure, the DPP configuration request frame may include at least one of channel information 2705 or 2710 or request information 2715, as illustrated in FIG. 27. In operation 2920, the processor 120 may determine whether AP configuration-related information is included in the DP configuration request frame. In an embodiment of the disclosure, the AP configuration-related information is information which can be used when the electronic device 101 as an enrollee AP, and may include, for example, channel information indicating a channel in which the enrollee STA 2605 may operate. When the AP configuration-related information is not included in the DPP configuration response frame, the processor 120 may transmit, in operation 2940, a DPP configuration response frame including connector information to an enrollee STA, and may proceed to operation 2945. When the AP configuration-related information is included in the DPP configuration response frame, the processor 120 may proceed to operation 2925.

In operation 2925, the processor 120 may determine whether it is possible to operate as an enrollee AP, by using the AP configuration-related information. In an embodiment of the disclosure, the processor 120 may determine whether the electronic device 101 may operate as a GO or Hotspot. When the electronic device 101 cannot be configured as an enrollee AP, the processor 120 may end a DPP configuration operation in operation 2930. On the other hand, when the electronic device 101 can operate as an enrollee AP, the processor 120 may transmit a DPP configuration response frame including AP configuration information and connector information to the enrollee STA 2605 in operation 2935, and may proceed to operation 2945. In an embodiment of the disclosure, the DPP configuration response frame may include at least one of a BSSID for identifying the electronic device 101 as an enrollee AP, channel information used to operate as an enrollee AP, or secure information.

The processor 120 may receive, in operation 2945, a DPP configuration result frame corresponding to the DPP configuration response frame, from the enrollee STA 2605, and may determine, in operation 2950, whether information indicating that DPP configuration of the enrollee STA 2605 has been successfully performed is included in the DPP configuration response frame. When the DPP configuration of the enrollee STA 2605 has been failed to be successfully performed, the processor 120 may end the DPP configuration in operation 2955.

When configuration of the enrollee STA 2605 is successfully performed, the processor 120 may periodically broadcast a beacon signal for Wi-Fi scanning of the enrollee STA 2605 on a channel corresponding to channel information provided through the DPP configuration response frame in operation 2960. The beacon signal may include a BSSID provided through the DPP configuration response frame.

The processor 120 may receive, in operation 2965, a DPP peer discovery request frame from the enrollee STA 2605 having detected the beacon signal, and may transmit, in operation 2970, a DPP peer discovery response frame including network role information indicating that the electronic device 101 is an enrollee AP, to the enrollee STA 2605. In an embodiment of the disclosure, when the DPP configuration response frame includes secure information used in the electronic device 101, operations 2965 and 2970 for beacon discovery with the enrollee STA 2605 may be omitted.

In operation 2975, the processor 120 may be connected to the enrollee STA 2605 by using secure information provided through the DPP configuration response frame.

A method performed by an electronic device according to an embodiment may include receiving, from an external electronic device, a configuration request frame including identification information identifying an enrollee access point (AP), in order to configure the external electronic device as the enrollee AP, transmitting, to the external electronic device, a configuration response frame including first channel information indicating a channel used in scanning the external electronic device by the electronic device, based on the configuration request frame, acquiring connection information of the external electronic device by performing scanning based on the first channel information, and connecting to the external electronic device, based on the connection information of the external electronic device.

In an embodiment of the disclosure, the connecting may include transmitting, to the external electronic device, a peer discovery request frame including network role information indicating that the electronic device is an enrollee terminal (STA), based on the connection information, receiving a peer discovery response frame corresponding to the peer discovery request frame from the external electronic device, and connecting to the external electronic device, based on the peer discovery response frame.

In an embodiment of the disclosure, the configuration request frame may include second channel information indicating a channel in which the external electronic device operates as the enrollee AP, and the second channel information may be used to generate the first channel information.

In an embodiment of the disclosure, the first channel information may include at least one of a support band field indicating at least one frequency band supported by the electronic device, or a band field indicating a frequency band which can be used while the electronic device operates as an enrollee STA, and the scanning may include searching for the enrollee AP having the identification information on a channel indicated by the first channel information.

In an embodiment of the disclosure, the configuration request frame may include request information requesting secure information used while the electronic device operates as the enrollee AP, and the configuration response frame may include the secure information in response to the request information.

A method performed by an electronic device according to an embodiment may include receiving, from an external electronic device, a configuration request frame configured to configure the external electronic device as an enrollee terminal (STA), transmitting, to the external electronic device, a configuration response frame including first channel information indicating a channel used while the electronic device operates as an enrollee access point (AP) and identification information identifying the enrollee AP, based on the configuration request frame, broadcasting a beacon signal scannable by the external electronic device, based on the first channel information and the identification information, and connecting to the external electronic device while operating as the enrollee AP.

In an embodiment of the disclosure, the connecting may include receiving a peer discovery request frame from the external electronic device, in response to the peer discovery request frame, transmitting, to the external electronic device, a peer discovery response frame including network role information indicating that the electronic device is the enrollee AP, and connecting to the external electronic device, based on the peer discovery response frame.

In an embodiment of the disclosure, the configuration request frame may second channel information indicating a channel in which the external electronic device operates as the enrollee STA, the second channel information may be used to generate the first channel information, the first channel information may include at least one of a support band field indicating at least one frequency band supported by the electronic device, or a band field indicating a frequency band which can be used while the electronic device operates as an enrollee STA, and the beacon signal may include the identification information and may be transmitted on a channel indicated by the first channel information.

In an embodiment of the disclosure, the configuration request frame may include request information requesting secure information used while the electronic device operates as the enrollee AP, and the configuration response frame may include the secure information in response to the request information.

Various embodiments of the disclosure may allow an unnecessary some DPP operations to be omitted when an electronic device performs self-configuration by the DPP, thereby reducing a DPP performing time.

Various embodiments of the disclosure may negotiate in advance with an external electronic device about a channel connectable to the external electronic device when an electronic device operates as an enrollee AP or an enrollee STA, so that only scanning for some channels may be performed instead of performing Wi-Fi scanning for all channels, in order to search for a channel used for communication with the external electronic device, and thus a time required for AP search through Wi-Fi scanning can be reduced and waste of current consumption in the electronic device can be reduced.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuitry;

memory, comprising one or more storage media, storing instructions; and at least one processor communicatively coupled to the communication circuitry and the memory, wherein the instructions, when executed by the at least one processor individually or collectively, cause the electronic device to:

receive, from an external electronic device through the communication circuitry, a configuration request frame comprising identification information identifying an enrollee access point (AP) to configure the external electronic device as the enrollee AP, transmit, to the external electronic device through the communication circuitry, a configuration response frame comprising first channel information indicating a channel used in scanning the external electronic device by the electronic device, based on the configuration request frame, acquire connection information of the external electronic device by performing scanning through the communication circuitry, based on the first channel information and the identification information, and connect to the external electronic device through the communication circuitry, based on the connection information of the external electronic device, wherein the instructions, when executed by the at least one processor individually or collectively, further cause the electronic device to configure the enrollee AP while operating as a device provisioning protocol (DPP) configurator, and subsequently access the enrollee AP by operating as an enrollee terminal (STA) when the configuration of the enrollee AP is completed.

2. The electronic device of claim 1, wherein the instructions, when executed by the at least one processor individually or collectively, further cause the electronic device to:

transmit, to the external electronic device, a peer discovery request frame comprising network role information indicating that the electronic device is an enrollee terminal (STA), based on the connection information, receive a peer discovery response frame corresponding to the peer discovery request frame from the external electronic device, and connect to the external electronic device, based on the peer discovery response frame.

3. The electronic device of claim 1, wherein the configuration request frame comprises second channel information indicating a channel in which the external electronic device operates as the enrollee AP, and wherein the second channel information is used to generate the first channel information.

4. The electronic device of claim 1, wherein the first channel information comprises at least one of a support band field indicating at least one frequency band supported by the electronic device, or a band field indicating a frequency band which can be used while the electronic device operates as an enrollee STA, and wherein the scanning comprises searching for the enrollee AP having the identification information on a channel indicated by the first channel information.

5. The electronic device of claim 1, wherein the configuration request frame comprises request information requesting secure information used while the electronic device operates as an enrollee STA, and wherein the configuration response frame comprises the secure information in response to the request information.

6. The electronic device of claim 1, wherein the configuration response frame comprises secure information used while the electronic device operates as an enrollee STA, and wherein the secure information comprises at least one of a preshared key (PSK), a passphrase, or a credential.

7. A method performed by an electronic device, the method comprising:

receiving, from an external electronic device, a configuration request frame comprising identification information identifying an enrollee access point (AP) in order to configure the external electronic device as the enrollee AP;

transmitting, to the external electronic device, a configuration response frame comprising first channel information indicating a channel used in scanning the external electronic device by the electronic device, based on the configuration request frame;

acquiring connection information of the external electronic device by performing scanning based on the first channel information;

connecting to the external electronic device, based on the connection information of the external electronic device;

configuring the enrollee AP while operating as a device provisioning protocol (DPP) configurator; and subsequently accessing the enrollee AP by operating as an enrollee terminal (STA) when the configuration of the enrollee AP is completed.

8. The method of claim 7, wherein the connecting to the external electronic device comprises:

transmitting, to the external electronic device, a peer discovery request frame comprising network role information indicating that the electronic device is an enrollee terminal (STA), based on the connection information;

receiving a peer discovery response frame corresponding to the peer discovery request frame from the external electronic device; and connecting to the external electronic device, based on the peer discovery response frame.

9. The method of claim 7, wherein the configuration request frame comprises second channel information indicating a channel in which the external electronic device operates as the enrollee AP, and wherein the second channel information is used to generate the first channel information.

10. The method of claim 7, wherein the first channel information comprises at least one of a support band field indicating at least one frequency band supported by the electronic device, or a band field indicating a frequency band which can be used while the electronic device operates as an enrollee STA, and wherein the scanning comprises searching for the enrollee AP having the identification information on a channel indicated by the first channel information.

11. An electronic device comprising:

a communication circuitry;

memory, comprising one or more storage media, storing instructions; and at least one processor communicatively coupled to the communication circuitry and the memory, wherein the instructions, when executed by the at least one processor individually or collectively, cause the electronic device to:

receive, from an external electronic device through the communication circuitry, a configuration request frame configured to configure the external electronic device as an enrollee terminal (STA), transmit, to the external electronic device through the communication circuitry, a configuration response frame comprising first channel information indicating a channel used while the electronic device operates as an enrollee access point (AP) and identification information identifying the enrollee AP, based on the configuration request frame, broadcast, through the communication circuitry, a beacon signal scannable by the external electronic device, based on the first channel information and the identification information, and connect to the external electronic device through the communication circuitry while operating as the enrollee AP, wherein the instructions, when executed by the at least one processor individually or collectively, further cause the electronic device to configure the enrollee STA while operating as a device provisioning protocol (DPP) configurator, and subsequently function as a hotspot for connecting the enrollee STA to internet while operating as the enrollee AP.

12. The electronic device of claim 11, wherein the instructions, when executed by the at least one processor individually or collectively, further cause the electronic device to:

receive, from the external electronic device, a peer discovery request frame, in response to the peer discovery request frame, transmit, to the external electronic device, a peer discovery response frame comprising network role information indicating that the electronic device is the enrollee AP, and connect to the external electronic device, based on the peer discovery response frame.

13. The electronic device of claim 11, wherein the configuration request frame comprises second channel information indicating a channel in which the external electronic device operates as the enrollee STA, and wherein the second channel information is used to generate the first channel information.

14. The electronic device of claim 11, wherein the first channel information comprises at least one of a support band field indicating at least one frequency band supported by the electronic device, or a band field indicating a frequency band which can be used while the electronic device operates as an enrollee STA, and wherein the beacon signal comprises the identification information and is transmitted on a channel indicated by the first channel information.

15. The electronic device of claim 11, wherein the configuration request frame comprises request information requesting secure information used while the electronic device operates as the enrollee AP, and wherein the configuration response frame comprises the secure information in response to the request information.

16. A method performed by an electronic device, the method comprising:

receiving, from an external electronic device, a configuration request frame configured to configure the external electronic device as an enrollee terminal (STA);

transmitting, to the external electronic device, a configuration response frame comprising first channel information indicating a channel used while the electronic device operates as an enrollee access point (AP) and identification information identifying the enrollee AP, based on the configuration request frame;

broadcasting a beacon signal scannable by the external electronic device, based on the first channel information and the identification information;

connecting to the external electronic device while operating as the enrollee AP:

configuring the enrollee STA while operating as a device provisioning protocol (DPP) configurator; and subsequently functioning as a hotspot for connecting the enrollee STA to internet while operating as the enrollee AP.

17. The method of claim 16, wherein the connecting to the external electronic device comprises:

receiving a peer discovery request frame from the external electronic device;

in response to the peer discovery request frame, transmitting, to the external electronic device, a peer discovery response frame comprising network role information indicating that the electronic device is the enrollee AP; and connecting to the external electronic device, based on the peer discovery response frame.

18. The method of claim 16, wherein the configuration request frame comprises second channel information indicating a channel in which the external electronic device operates as the enrollee STA, and wherein the second channel information is used to generate the first channel information.

19. The method of claim 16, wherein the first channel information comprises at least one of a support band field indicating at least one frequency band supported by the electronic device, or a band field indicating a frequency band which can be used while the electronic device operates as an enrollee STA, and wherein the beacon signal comprises the identification information and is transmitted on a channel indicated by the first channel information.

20. The method of claim 16, wherein the configuration request frame comprises request information requesting secure information used while the electronic device operates as the enrollee AP, and wherein the configuration response frame comprises the secure information in response to the request information.

* * * * *